US011652848B1

(12) United States Patent
Talur et al.

(10) Patent No.: US 11,652,848 B1
(45) Date of Patent: May 16, 2023

(54) DISTRIBUTED EVALUATION OF NETWORKING SECURITY RULES

(71) Applicant: Amazon Technologies, Inc., Seattle, WA (US)

(72) Inventors: Dheerendra Talur, Sammamish, WA (US); Venkat Maithreya Paritala, Seattle, WA (US); Abhishek Chhajer, Seattle, WA (US); Charlie Jahchan, Seattle, WA (US); Yogeshkumar Kuite, Milpitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 457 days.

(21) Appl. No.: 16/584,858

(22) Filed: Sep. 26, 2019

(51) Int. Cl.
H04L 29/00 (2006.01)
H04L 9/40 (2022.01)

(52) U.S. Cl.
CPC .......... H04L 63/20 (2013.01); H04L 63/0272 (2013.01); H04L 63/1433 (2013.01)

(58) Field of Classification Search
CPC .. H04L 63/20; H04L 63/0272; H04L 63/1433
See application file for complete search history.

(56) References Cited

U.S. PATENT DOCUMENTS

| | | | |
|---|---|---|---|
| 7,107,609 B2 | 9/2006 | Cheng et al. | |
| 7,509,673 B2 | 3/2009 | Swander et al. | |
| 7,523,493 B2* | 4/2009 | Liang | H04L 63/145 |
| | | | 726/13 |
| 7,536,715 B2 | 5/2009 | Markham | |
| 7,596,806 B2 | 9/2009 | Chen | |
| 7,877,781 B2* | 1/2011 | Lim | H04L 63/10 |
| | | | 726/1 |
| 8,176,553 B1 | 5/2012 | Magdych et al. | |
| 8,244,909 B1* | 8/2012 | Hanson | H04L 45/12 |
| | | | 711/216 |
| 8,316,435 B1* | 11/2012 | Varadhan | H04L 45/60 |
| | | | 726/2 |
| 8,458,769 B2* | 6/2013 | Dilley | H04L 67/10 |
| | | | 726/2 |
| 8,762,412 B2* | 6/2014 | Lim | G06F 21/604 |
| | | | 709/229 |
| 8,875,218 B2* | 10/2014 | Lim | H04L 63/20 |
| | | | 713/153 |
| 9,118,689 B1* | 8/2015 | Apte | H04L 63/1425 |
| 9,998,955 B1 | 6/2018 | MacCarthaigh | |
| 10,419,496 B2* | 9/2019 | Panchalingam | H04L 65/1006 |

(Continued)

OTHER PUBLICATIONS

Amazon Virtual Private Cloud, "Security Groups for your VPC", dated 2019, pp. 1-13.

Primary Examiner — Don G Zhao
(74) Attorney, Agent, or Firm — Robert C. Kowert; Kowert, Hood, Munyon, Rankin & Goetzel, P.C.

(57) ABSTRACT

A plurality of security rule processing nodes is configured for network traffic of a set of sources and destinations. Respective subsets of configuration information of the sources and destinations, including security rules, are transmitted to the nodes. Respective addresses of at least a subset of the nodes are transmitted to a packet processing intermediary. The intermediary requests evaluation of applicable security rules with respect to packet flows by selected nodes prior to initiating routing actions for packets of the flows.

20 Claims, 13 Drawing Sheets

(56) References Cited

U.S. PATENT DOCUMENTS

| | | | |
|---|---|---|---|
| 11,070,522 B1* | 7/2021 | Maharia | H04L 63/0263 |
| D942,677 S * | 2/2022 | Walker | D27/162 |
| 11,240,256 B2* | 2/2022 | Bania | H04L 63/20 |
| 2006/0215684 A1 | 9/2006 | Capone | |
| 2008/0101367 A1* | 5/2008 | Weinman | H04L 63/20 |
| | | | 370/392 |
| 2009/0016226 A1* | 1/2009 | LaVigne | H04L 63/1408 |
| | | | 370/241 |
| 2010/0186062 A1* | 7/2010 | Banti | G06F 21/6263 |
| | | | 726/1 |
| 2012/0016721 A1* | 1/2012 | Weinman | G06Q 30/02 |
| | | | 705/7.35 |
| 2014/0337500 A1* | 11/2014 | Lee | H04L 67/2866 |
| | | | 709/223 |
| 2015/0143504 A1* | 5/2015 | Desai | H04L 63/0245 |
| | | | 709/224 |
| 2017/0289190 A1* | 10/2017 | Kominar | H04L 63/1433 |
| 2017/0366506 A1* | 12/2017 | Panchalingam | H04L 65/1104 |
| 2018/0006954 A1* | 1/2018 | Arora | H04M 15/31 |
| 2018/0219875 A1* | 8/2018 | Bania | H04L 63/20 |
| 2019/0098050 A1* | 3/2019 | Lumezanu | H04L 63/1416 |
| 2019/0109714 A1* | 4/2019 | Clark | G06F 9/45558 |
| 2019/0132216 A1* | 5/2019 | Horn | H04L 41/0893 |
| 2021/0021471 A1* | 1/2021 | Jayaraman | H04L 41/0803 |
| 2021/0392167 A1* | 12/2021 | Sweeney | H04L 45/34 |

* cited by examiner

Example security rules usage scenario 505

DISTRIBUTED EVALUATION OF NETWORKING SECURITY RULES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization server to be shared among multiple users by providing each user with one or more "guest" virtual machines hosted by the single virtualization server. Each such virtual machine may represent a software simulation acting as a distinct logical computing system that provides users with the illusion that they are the sole operators of a given hardware computing resource, while also providing application isolation and security among the various virtual machines. Instantiating several different virtual machines on the same host may also help increase the overall hardware utilization levels at a data center, leading to higher returns on investment. As demand for virtualization-based services at provider networks has grown, more and more networking and interconnectivity-related features may have to be added to meet the requirements of applications being implemented using the services.

Figure 1:
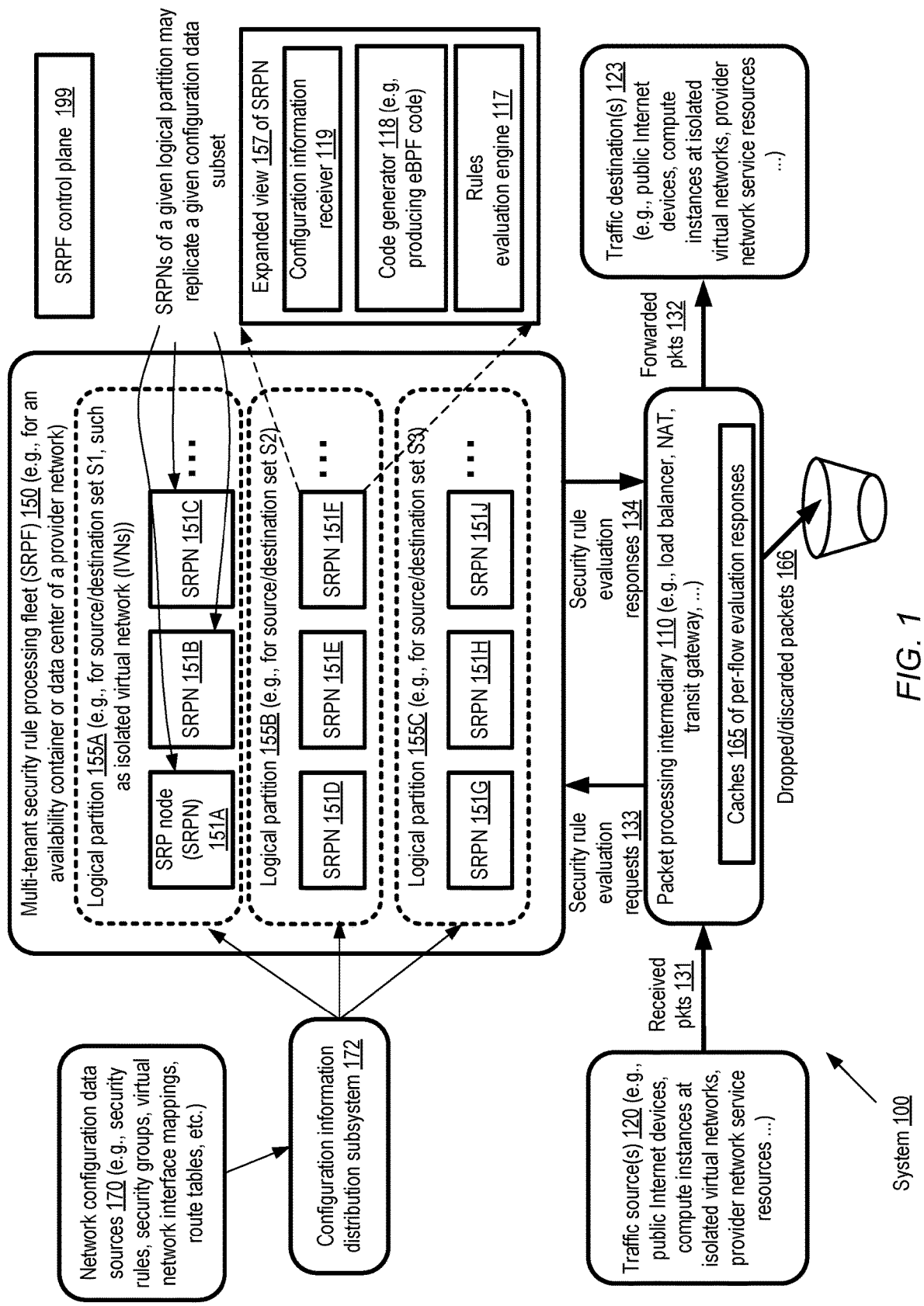
FIG. 1 illustrates an example system environment in which a distributed fleet of security rule processing nodes may be implemented for network traffic associated with a set of traffic sources and destinations, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for evaluating network security rules (which can be used to restrict inbound and outbound network traffic with respect to specified resources) at a provider network using a scalable fleet of security rule processing nodes. Networks set up by an entity such as a company or a public sector organization to provide one or more network-accessible services (such as various types of cloud-based computing, storage or analytics services) accessible via the Internet and/or other networks to a distributed set of clients may be termed provider networks. A provider network may sometimes be referred to as a "cloud provider network", a "public cloud" environment, or simply a "cloud". A cloud refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load.

Within a provider network, in some embodiments, groups of resources (including, for example, compute instances of a virtualized computing service (VCS)) may be configured as isolated virtual networks on behalf of respective clients of the provider network. As indicated by the name, an isolated virtual network (IVN) may be logically isolated from the rest of the provider network (and other networks outside the provider network) with respect to various aspects of network configuration—for example, internal or "private" IP addresses may be assigned to resources of a given IVN independently of the addresses assigned within other networks, network security rules of a given IVN may restrict the sources and destinations with which resources of the IVN may communicate, and so on. Isolated virtual networks may be called "virtual private clouds (VPCs)" in some implementations. In at least some embodiments, one or more virtual network interfaces (VNIs) may be configured and attached to resource such as compute instances within IVNs. A VNI may comprise a logical entity with a set of networking and security-related attributes that can be attached to (or detached from) a compute instance and/or other computing devices programmatically, or used for routing purposes within an IVN without necessarily being attached to a compute instance. For example, at least one IP (Internet Protocol) address "IPaddr1" may be assigned to a given virtual network interface VNI1, and networking security rules restricting inbound and outbound traffic may be set for VNI1. The security rules may be specified, for example, by a client via programmatic interfaces of the VCS, and/or by administrators of the VCS. When that VNI is programmatically attached to a given compute instance CI1 launched at a host with a physical network interface card NIC1, network packets indicating IPaddr1 as their destination address (and complying with the security rules) may be received at CI1 via NIC1. In addition, outbound packets generated at CI1 may indicate IPaddr1 as their source address and may be physically transmitted towards their destinations via NIC1. If VNI1 is then programmatically detached from CI1 and attached to CI2 (which is executing at a different host with a different physical network interface card NIC2), the IPaddr1 traffic that was previously being received at CI1 may now be received at CI2, with the same networking security rules in place. VNIs may also be configured in one or more multiplexed modes in some embodiments. In one such multiplexed mode, a common network address (referred to as a client-accessible service endpoint address or CSEA) may be associated with a group of VNIs associated with a provider network service, and traffic directed to that address may actually be distributed among a plurality of compute instances or hosts. In another multiplexed mode, several such CSEAs may be assigned to a given VNI designated as a "trunk" VNIs, and traffic directed to a given CSEAs may be distributed among a respective group of compute instances or hosts.

In some embodiments, a packet processing service (PPS) may be implemented at a provider network, and such a service may in turn be employed for a variety of tasks including load balancing, policy-based routing, network address translation, and intrusion detection. For example, an instance of a load balancer may be set up using such a PPS, acting as an intermediary between a collection of request submitters and a collection of back-end servers of an application run using provider network resources. The requests may be submitted, for example, from one or more IVNs, and the back-end servers may be configured within one or more other IVNs. One or more VNIs may be set up for inbound traffic with respect to the load balancer, as well as for inbound traffic of the back-end servers. Network security rules may be specified, e.g., using programmatic interfaces by the provider network client on whose behalf the back-end servers are configured, indicating the network addresses and ports of permitted request submitters as well as the network addresses and ports of the back-end servers. In addition to the security rules, additional metadata such as the load balancing algorithm(s) to be used may also be specified programmatically by the client in various embodiments. In order to decide the particular routing action to be performed for a given packet directed to the load balancer (e.g., whether the packet is to be routed to a particular back-end server, or dropped), such network security rules may have to be evaluated.

In some embodiments, the PPS may comprise a plurality of multi-tenant nodes arranged in several logical tiers, with nodes at multiple tiers collectively responsible for deciding and implementing routing actions for packets received at the PPS. Some nodes may, for example, contain decision making logic for identifying routing and/or packet transformation actions to be performed, while other nodes may be designed for fast implementation of the actions identified using the decision making logic. It may be impractical to keep the configuration information required to evaluate all the relevant networking security rules for all the applications being implemented with the help of the PPS consistent and up-to-date at each of the PPS nodes. Accordingly, in various embodiments, a security rules processing fleet (SRPF), comprising multiple security rule processing nodes (SRPNs) (distinct from the PPS nodes) may be employed to evaluate the relevant security rules for various packet flows in at least some embodiments. In effect, the SRPF may be used to offload the work associated with evaluating security rules in such embodiments from the resources used for packet processing intermediaries (such as the load balancer) implemented at the PPS. Configuration information pertinent to security rule evaluation (including the security rules themselves, mappings between IVNs and virtual network interfaces, routing table entries, and the like) may be distributed among the SRPNs, e.g., from administrative or control plane components of a virtualized computing service (VCS) and/or other services implemented at the provider network in some embodiments.

The security rule processing work of numerous packet processing applications may be distributed (e.g., using hashing and sharding techniques) among the SRPNs in such a way as to avoid overwhelming the resource capacities of individual SRPNs in various embodiments. For example, the SRPF may be organized into a plurality of logical partition or "shards" in some embodiments, with each shard responsible for processing security rules of a respective subset of traffic sources and/or destinations in one embodiment. Within a given logical partition, at least a subset of the configuration information used for rule processing may be replicated among several different nodes, and a hashing algorithm based on packet header element combinations may be used to select which particular node of the partition should process the rules pertaining to a given packet. SRPNs that store replicated configuration information may also be able to take over the packet processing responsibilities of other SRPNs of the same partition if needed in some embodiments. In response to changing security rule processing workload levels, one or more types of auto-scaling techniques may be employed in at least some embodiments, so that the clients on whose behalf the security rules are being applied do not have to be concerned about resource provisioning. A number of approaches to recover from failures of individual SRPNs quickly and efficiently may be employed in different embodiments.

In some embodiments, individual packet flows for which security rules are evaluated at the SRPFs may be distinguished from one another based on some combination of packet properties such as source and destination network addresses, source and destination ports, the networking protocol being used, identifiers of provider network clients on whose behalf the packets are being sent or received, and/or source and destination IVN identifiers. Once the network security rules applicable to a given packet flow are evaluated, the results of the evaluation (indicating, for example, whether the packets of the flow are to be dropped or transmitted/forwarded with or without transformation) may be cached at the packet processing intermediary used for the packet flow in various embodiments, and re-evaluation of the security rules may not be required for additional packets of the flow. In some embodiments, different SRPNs may be used to evaluate ingress security rules for a set of resources (i.e., rules about inbound traffic) than are used for egress security rules for the same set of resources (i.e., rules about outbound traffic).

As one skilled in the art will appreciate in light of this disclosure, certain embodiments may be capable of achieving various advantages and practical applications/benefits, including some or all of the following: (a) enabling very high volumes of network security rule processing to be performed for various types of distributed packet processing applications at a provider network, (b) reducing the amount of security-related processing that has to be performed at packet processing services at which such applications are implemented, thereby enabling higher throughputs and lower response times for the packet processing applications and/or (c) enhancing the user experience of network administrators and packet processing application vendors, by separating the implementation (and related logging/debugging) of security related operations from the implementation (and related logging/debugging) of packet processing application logic.

According to some embodiments, a system may comprise one or more computing devices. The devices may include instructions that upon execution on or across one or more processors cause the one or more computing devices to distribute, from a control plane of a virtualized computing service (VCS) of a provider network, respective subsets of network configuration information to a plurality of security rule processing nodes (SRPNs). The SRPNs may be configured for the traffic associated with at least some IVNs of the VCS in various embodiments. The network configuration information may include a plurality of security rules as well as associated mappings (e.g., between IVNs and virtual network interfaces or VNIs), route table entries and the like in some embodiments. In various embodiments, a given security rule may indicate, for a given direction of traffic with respect to a VNI (such as inbound traffic to an address assigned to the VNI, or outbound traffic from an address assigned to the VNI), one or more allowed or permitted traffic source addresses and source ports, and/or one or more allowed or permitted destination traffic addresses and destination ports. The networking protocol (e.g., Transmission Control Protocol or TCP) to which the security rule applies may also be included in the security rule in some embodiments. In different embodiments, traffic sources and/or destinations may be specified in a security rule using any of a variety of naming conventions: e.g., a range of Internet Protocol (IP) addresses expressed in Classless Inter-Domain Routing (CIDR) format may be used, individual IP addresses may be used, an identifier of a security group (a group of security rules) configured for one or more VNIs may be used, or an identifier of a network-accessible service of the provider network may be used.

The collection of SRPNs may be subdivided into a plurality of partitions, with individual partitions assigned to respective sub-groups of IVNs or clients in at least one embodiment. At least some of the partitions may comprise a plurality of replica nodes in some embodiments; at each replica node of a given partition, a copy of a subset of the network configuration information, pertinent to the IVN sub-group or client sub-group to which the partition is assigned, may be stored. In some embodiments, not all the SRPNS of a partition may necessarily store an exact replica of the network configuration information. The SRPNs may collectively be referred to as a security rule processing fleet (SRPF).

Information about the plurality of SRPNs (e.g., network addresses of the SRPNs, as well as functions or algorithms to be used to select the appropriate SRPN for a given packet) may be obtained at a packet processing service (PPS) in various embodiments. The PPS may comprise a plurality of logical tiers or layers in some embodiments, with a plurality of nodes at each tier, and the information about the SRPNs may be distributed to at least some nodes at one or more tiers. The PPS may be used to implement various types of packet processing applications (such as load balancers, network address translators, and the like) in a multi-tenant manner, e.g., for packets originating at various IVNs (as well as other types of traffic sources) and directed towards other IVNs (or other types of traffic destinations). The packet processing operations performed at the PPS may require network security rules to be evaluated in at least some embodiments—e.g., a load balancer for a set of back-end servers may have to determine whether request-containing packets directed to the load balancer comply with the security rules assigned to a receiving-side VNI of the load balancer, before selecting the servers to which the request-containing packets are to be sent.

A packet of a particular flow, associated with a particular IVN (e.g., the IVN at which a source network address of the packet is configured) may be received at the PPS. One or more nodes of the PPS may determine (e.g., as a result of a miss in a cache of security rule evaluation results maintained at the PPS, or as a result of a miss in a cache of actions identified earlier for respective packet flows) that a security rule applicable to the particular flow has not yet been evaluated. In various embodiments, a target replica SRPN of a target partition of the SRPF may be identified at the PPS, e.g., using one or more mapping functions or algorithms based on various attributes of the packet. In one implementation, an identifier of an IVN from which the packet was received may be determined at the PPS, and used to select the target partition of the SRPF (e.g., the IVN identifier may be supplied as input to a function whose output indicates the target partition). Alternatively, in other implementations, other properties of the packet, such as an identifier of a virtual network interface (VNI) from which the packet was received, or an identifier of a provider network client on whose behalf the packet is being sent or received, may be used to select the target partition. Within the partition, in some embodiments, a flow hash function (whose input includes the source and destination addresses and/or ports of the packet) may be used to select the target replica SRPN. The packet and/or associated metadata may be transmitted from the PPS to the target replica SRPN, e.g., in the form of a security rule evaluation request. The associated metadata may for example include an identifier of the client on whose behalf the packet is being transmitted, an identifier of an IVN from which the packet is received, an identifier of a VNI from which or to which the packet is being transmitted, and so on.

At the target SRPN, in various embodiments, one or more security rules applicable to the flow to which the packet belongs may be identified and evaluated, e.g., using the subset of the network configuration information which was earlier distributed to the target replica node, as well as one or more headers and/or other attributes of the packet or the metadata provided by the PPS. The result of the evaluation (e.g., an indication as to whether the applicable security rules allow further processing/routing of the packet, as well as subsequent packets of the same flow) may be provided to the PPS from the target replica SRPN in various embodiments, and at least one routing action may be initiated at the PPS based at least in part on the result. Note that in some embodiments, more than one SRPN may be used to evaluate the security rules pertinent to a given packet flow: e.g., one SRPN may evaluate rules governing inbound traffic to the PPS, and a second SRPN may evaluate one or more rules governing outbound traffic from the PPS.

Logic to be used to evaluate security rules may be stored in executable form at the SRPNs in some embodiments, e.g., as byte code expressed using instructions of a register-based virtual machine optimized for implementing network processing operations, which can be used to perform operations similar to those of the extended Berkeley Packet Filter (eBPF) interface. In one implementation, for example, an eBPF program may be restricted in several ways—the maximum number of instructions may be limited, only a few 64-bit registers may be available, only forward conditional jumps may be supported, and so on. As a result of the restrictions, the logic expressed as an eBPF program may be executed very quickly in such an implementation. In some embodiments, an SRPN may include a code generator which consumes network configuration information provided by the VCS control plane as input and produces the executable version of the rule evaluation logic. In other embodiments, the network configuration information provided by the control plane may include the executable form of the rules. In at least some embodiments, at least some of the SRPNS may include respective eBPF program execution engines or virtual machines which are used for rule evaluation.

The network configuration information propagated to the SRPNs may include any combination of several types of data in different embodiments. For example, it may include a mapping from a security group identifier to one or more security rules in one embodiment, where the security group identifier is created in response to a programmatic request from a client of a computing service and assigned to one or more virtual network interfaces. In some embodiments, the network configuration information may also or instead include one or more of the following: a mapping from a VNI to a security group, a mapping from a security group to a VNI, one or more route table entries, and/or one or more rules of an encapsulation protocol utilized for routing traffic of compute instances (which have virtual network addresses assigned to VNIs) between physical servers of the VCS (which have physical network interface cards and corresponding network addresses from an address range of a substrate network, distinct from the virtual network addresses of the VNIs). Route table entries may be used for security rule evaluation in the following way in some embodiments. In some cases, depending for example on the way that a destination is specified in a security rule, one or more route table entries included in the configuration information provided to the SRPN may first have to be examined (e.g., using a longest prefix match algorithm) to identify a destination virtual network interface (VNI). After a destination VNI is identified, the SRPN may check whether that VNI belongs to a security group which is among the security groups to which the SRPN is allowed to transmit packets.

In at least one embodiment, efficient data structures, such as a lock-free, concurrent version of an open addressing hash table with $O(1)$ lookup time, may be used to store at least a portion of the network configuration information at an SRPN. In such an embodiment, evaluating the security rules applicable to a packet or flow may comprises accessing such a hash table at an SRPN. In some embodiments, an individual SRPN may comprise one or more processes running at a compute instance of the VCS—that is, the SRPF may itself utilize virtualized computing. In other embodiments, SRPNs may run on un-virtualized servers. In some embodiments, at least some SRPNs may be run within an IVN set up specifically for security rule processing.

The PPS-based application whose nodes communicate with the SRPF to obtain the results of the security rule evaluation represent one example of a packet processing intermediary that may benefit from offloaded security rule evaluation in various embodiments. Other types of packet processing intermediaries (such as virtualization management components of virtualization servers at which compute instances of the VCS are run) may also use the SRPF in some embodiments, e.g., during live migration operations in which a given compute instance and its associated VNI may temporarily co-exist at multiple virtualization servers.

In some embodiments, a provider network may comprise numerous data centers organized into a hierarchy of regions and/or availability containers, with each availability container having a separate failure profile (with independent sets of computing, physical plant and other resources set up at each availability container so as to prevent failures from crossing availability container boundaries). In at least one such embodiment, respective SRPFs may be configured for each availability container.

Example System Environment

FIG. 1 illustrates an example system environment in which a distributed fleet of security rule processing nodes may be implemented for network traffic associated with a set of traffic sources and destinations, according to at least some embodiments. As shown, system 100 includes a multi-tenant security rule processing fleet (SRPF) 150 of a provider network, one or more network configuration data sources 170, a configuration information distribution subsystem 172, and a packet processing intermediary 110. The packet processing intermediary 110, which may for example comprise various nodes of a packet processing service, may receive network packets originating at set of traffic sources 120, use the SRPF to evaluate security rules pertaining to the packets, and transmit corresponding packets to one or more traffic destinations if the security rules permit such transmissions in the depicted embodiment. If the evaluated security rules do not permit such transmissions, the packets 131 received from traffic sources 120 may be dropped or discarded by the packet processing intermediary 110, as indicated by arrow 166.

Traffic associated with a wide variety of sources 120 and destinations 123 may be processed at the intermediary 110 in different embodiments. For example, sources and/or destinations may include devices of the public Internet, devices such as compute instances of isolated virtual networks (IVNs) of a virtualized computing service (VCS) of the provider network, and/or resources of one or more other services of the provider network such as a storage service or a database service. Any of a number of different packet processing applications may be implemented at the packet processing intermediary 110, such as load balancing applications, network address translation (NAT), transit gateway or hub applications used to link IVNs and other types of networks, and so on.

In the embodiment depicted in FIG. 1, clients of the provider network may submit programmatic requests indicating security rules to be applied for applications implemented at the packet processing intermediary 110. In some embodiments, one or more programmatic interfaces (e.g., web-based consoles, command-line tools, graphical user interfaces and/or a set of application programming interfaces or APIs) may be implemented at the provider network to enable clients to submit configuration requests. Such interfaces may be used to request the assignment of security groups, each comprising one or more security rules to be applied or enforced with respect to one or more virtual network interfaces (VNIs) set up at the provider network on behalf of the clients. Individual VNIs may have one or more network addresses (e.g., IP version 4 or IP version 6) addresses assigned to them in the depicted embodiment, as well as a number of other attributes including one or more security rules. A given security rule may, for example, indicate a set of traffic sources from which packets of a given networking protocol may be accepted for an address associated with the VNI, and/or a set of traffic destinations to which packets of a given networking protocol may be transmitted from the address associated with the VNI. One or more VNIs may be set up at some types of traffic sources (such as compute instances within IVNs set up on behalf of provider network clients), and traffic from the sources may be directed to other VNIs set up as the entry points for the packet processing intermediary 110 in some embodiments. Similarly, traffic from one or more exit points of the packet processing intermediary 110 (which may in some cases include the same VNIs that were set up as entry points of the packet processing intermediary 110) may be directed towards a third set of VNIs set up at one or more traffic destinations 123 if allowed by the security rules.

The security rules and rule groups established in response to client requests may be stored in metadata repositories of the provider network in the depicted embodiment. Network configuration data sources 170 may include such repositories of security rules and rule groups, as well as other repositories at which mappings between VNIs and IVNs, route tables and the like are stored. A configuration information distribution subsystem 172 may propagate at least a subset of the network configuration information which may be needed for security rule evaluation to various security rule processing nodes (SRPNs) 151 of the SRPF 150 in the depicted embodiment. As shown, the SRPF 150 may comprise a plurality of logical partitions 155 (e.g., 155A, 155B or 155C), with each logical partition responsible for responding to security rule evaluation requests 133 pertaining to traffic of a respective subset of traffic sources 120 and destinations 123 in the depicted embodiment. Thus, in one example scenario, if traffic originating at nine different IVNs (IVN1 through IVN9) were to be processed at the packet processing intermediary 110, and three logical partitions LP1, LP2 and LP3 of approximately equal capacity were set up at the SRPF, an algorithm comprising the use of one or more hash functions may be used to subdivide the rule processing workload of the twelve different IVNs approximately equally among the three logical partitions. In some embodiments, the input to such hash function(s) may comprise the identifiers of the respective IVNs, and the output of the algorithm may be an identifier of the logical partition. For example, IVN1, IVN2 and IVN7 may be mapped to LP1 in the above example via hashing; IVN3, IVN8 and IVN9 may be mapped to LP2, and IVN4, IVN5 and IVN6 may be mapped to LP3. Other partition selection schemes may be employed in other embodiments. When propagating the configuration information to the SRPNs, the same distribution algorithm may be employed in at least some embodiments by subsystem 172: that is, in the above example, configuration data relevant for traffic from IVN1, IVN2 and IVN7 may be provided to the SRPNs of LP1, configuration data relevant for traffic from IVN3, IVN8 and IVN9 may be provided to the SRPNs of LP2, and so on. Logical partitions 155 may be referred to as shards in some embodiments.

Within a given logical partition, in at least some embodiments, multiple SRPNs that each store and utilize the same subset of configuration data to respond to security rule evaluation requests may be configured in the depicted embodiment. Because each SRPN in a given logical partition stores a copy of the same configuration data for the logical partition's assigned traffic sources/destinations, the SRPNs within a logical partition may be referred to as replica SRPNs in some embodiments. Thus, SRPN 151A, 151B and 151C are replicas within logical partition 155A in FIG. 1; SRPNs 151D, 151E and 151F are replicas configured at logical partition 155B, and SRPNs 151G, 151H and 151J are replicas within logical partition 155C. In some embodiments, the configuration data stored at the different nodes of a logical partition need not necessarily be identical, at least during some time intervals.

As shown in the expanded view 157, an SRPN 151 may comprise a configuration information receiver 119, a code generator 118, and/or a rules evaluation engine 117 in some embodiments. The configuration information receiver 119 may obtain the subset of configuration information sent to it from subsystem 172, and transmit the configuration information to the code generator and/or the rules evaluation engine. In some embodiments, at least a subset of the configuration information may be stored using efficient data structures such as hash tables with O(1) lookup times (e.g., variants of Cuckoo hash tables) at the SRPNs. The code generator 118 may transform the security rules indicated in the received configuration information into executable form, e.g., as eBPF code. In some embodiments, a respective eBPF program may be generated for each security group; in other embodiments, a respective eBPF program may be generated for each rule of a security group. The rules evaluation engine 117 may, for example, run the eBPF programs of the security rules applicable to a given packet for which a security rule evaluation request 133 was received at the SRPN 151, and provide a response 134 comprising a result of the evaluation to the requester (e.g., a node of the packet processing intermediary) in the depicted embodiment. In some embodiments, eBPF may not be used for security rule evaluation. In various embodiments, SRPNs may be implemented using compute instances of a VCS—e.g., with respective sets of one or more processes or threads being used for the configuration information receiver 119, the code generator 118, and the rules evaluation engine 117. In other embodiments, non-virtualized servers may be used for SRPNs.

In at least some embodiments, at least some security rules may only have to be evaluated for the first packet of a packet flow; after the evaluation response is received, it may be stored in one or more caches 165 and re-used for subsequent packets of the flow. In some embodiments, a given packet flow may be distinguished from other packet flows using a 5-tuple of its header values such as (networking protocol, source network address, source network port, destination network protocol, destination network port) or a 6-tuple which includes the elements of the 5-tuple as well as an IVN identifier of a source IVN, an identifier of a VNI of the source IVN, or an identifier of a client on whose behalf the packet is transmitted. The evaluation result for the first packet of a flow may indicate, for example (a) that the packet should be processed further at the intermediary 110 (e.g., by forwarding the first packet or a transformed version of the first packet on towards its intended destination(s)) or (b) that the first packet should be dropped. The same type of routing action (further processing/transformation followed by transmission of one or more packets, or dropping the received packet) may be performed for subsequent packets of the same flow if any such packets are received at the intermediary 110 in at least some embodiments, based at least in part on looking up an entry of the cache(s) 165 for the flow.

In the depicted embodiment, information about the SRPF configuration (such as the types of hashing and other functions usable to identify the appropriate SRPN to which a security rule processing request 133 should be directed) may be provided to the packet processing intermediary 110, e.g., from devices of an SRPF control plane 199. For example, the control plane 199 may indicate the number of logical partitions and replica SRPNs per partition, network addresses of the SRPNs, that hashing (using a specified hash function) on a source IVN identifier (or an identifier of a client on whose behalf the packet is being transmitted) of a packet may be used to select a target logical partition 155, and that hashing on the 5-tuple of the packet (e.g., using another specified hash function) may be used to select a target replica SRPN within the target logical partition. When the packet processing intermediary receives a packet for which the caches 165 do not contain an earlier-obtained security rule evaluation result, the packet processing intermediary may identify the target logical partition 155 and a target SRPN replica 151 for the packet, and send a security rule evaluation to the target SRPN. The evaluation response 134 (which may be added to the caches 165) may then be used at the packet processing intermediary 110 to decide the type of routing action to be performed for the received packet and subsequent packets of the same flow. The routing action may then be performed by the packet processing intermediary, comprising for example a transmission of one or more packets to one or more traffic destinations 123, or dropping/discarding the received packet.

Note that traffic flowing in both directions (from sources 120 towards destinations 123, or from destinations 123 to sources 120) may be processed in a similar way at the packet processing intermediary 110. In at least some embodiments, security rules for both the forward direction and the reverse direction of such bi-directional transfers may be evaluated in response to receiving the first packet of the forward flow. In such embodiments, when the first packet in the reverse direction is received at the intermediary 110, the results of the reverse-direction flow may already be in the caches 165, so no further interaction with the SRPF may be required. In some embodiments, e.g., in a scenario in which the source of a traffic flow is in a different IVN than the destination, two separate SRPNs may be used when the first packet of the forward-direction traffic is received at the intermediary: one SRPN for evaluating the inbound security rules, and another SRPN for evaluating the outbound security rules. In other embodiments, a single SRPN may be used for evaluating rules applicable in both directions. In some embodiments, reverse direction security rules may not be evaluated until they are needed—e.g., they may be evaluated in response to the receipt of the first reverse-direction packet at the packet processing intermediary.

Example Packet Processing Service

Figure 2:
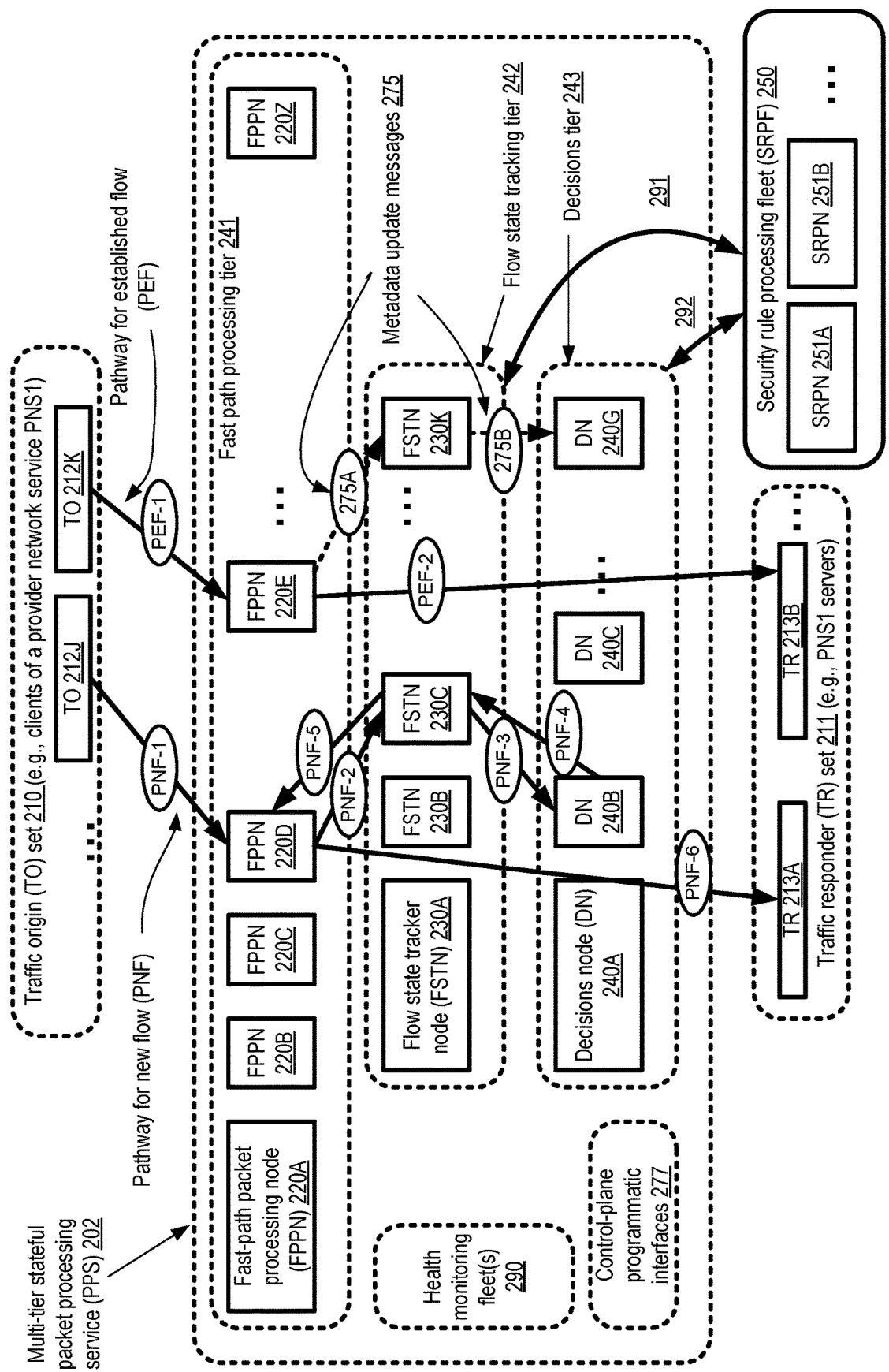
FIG. 2 illustrates an example packet processing service which may utilize a security rule processing fleet, according to at least some embodiments.

FIG. 2 illustrates an example packet processing service which may utilize a security rule processing fleet, according to at least some embodiments. A multi-tier stateful packet processing service (PPS) 202 includes respective collections of nodes of a fast path processing tier 241, a flow state tracking tier 242, and a decisions tier 243 in the depicted embodiment. Tier 241 comprises a plurality of fast path processing nodes (FPPNs) 220A-220Z, tier 242 comprises a plurality of flow state tracker nodes (FSTNs) 230A-230K, while tier 243 comprises a plurality of decisions nodes (DNs) 240A-240G. In general, any desired number of nodes may be instantiated at any of the tiers. The different tiers 241, 242 and 243 may collectively be responsible for implementing a variety of packet processing applications (such as load balancing, network address translation, multicasting, unicasting and the like) on behalf of numerous clients. Network security rules may be specified by PPS clients for the different applications (e.g., as properties or attributes of virtual network interfaces used as entry and/or exit points of the applications). Such rules may be evaluated at the request of FSTNs 230 and/or DNs 240 at one or more security rule processing nodes (SRPNs) 251 (e.g., 251A or 251B) of a security rule processing fleet (SRPF) 250, similar in features and functionality to SRPF 150, in the depicted embodiment.

In the depicted embodiment, packet processing decisions (e.g., involving packet rewriting/transformation and/or routing) may be made and implemented at the PPS 202 for packets originating at traffic origin set 210 (e.g., including traffic origins (TOs) 212J and 212K) and directed towards a set of traffic responders 211 (e.g., TR 213A and 213B). Packet rewriting may include, for example, modifying values of one or more packet headers, incorporating a packet within a larger packet in accordance with an encapsulation protocol, and so on. The traffic responders 211 may, for example, collectively implement a particular application using some set of resources of a provider network, and the traffic origins may represent client devices from which requests for that application are sent. An entity responsible for the application (e.g., a customer of the provider network) may submit a request indicating a particular type of packet processing requirement (e.g., a multicast requirement, an anycast requirement, a load balancing requirement, a source address substitution requirement, or the like) to the PPS 202, and operations to fulfill the requirement may accordingly be initiated for corresponding flows of received packets. The evaluation of applicable security rules at the SRPF 250 may be considered part of the packet processing procedure in the depicted embodiment, with the work of evaluating the rules being offloaded to the SRPF from the PPS. For example, further processing of a received packet may be abandoned if the security rule evaluation indicates that the packet is not from an expected/allowed source, while additional processing tasks such as generating a transformed version of the received packet and sending the transformed version on towards a destination permitted by the security rules may be initiated if the security rule evaluation indicates that the packet is from an expected/allowed source.

In some embodiments, when a packet of a flow for which decisions have not yet been made at the PPS is received at the PPS, respective packet processing decisions may be generated for both directions of traffic of the flow between two sets of endpoints: e.g., one decision may be applied for packets originating at traffic originator set 210 and directed towards traffic responders 211 via the PPS, and another directive may be applied for packets flowing from the responders 211 to the originators 210 via the PPS. With respect to the forward flow (which may be defined as packets flowing from a traffic originator towards a traffic responder), packets from a traffic originator to the PPS may be designated as "inbound" with respect to the PPS, and packets from the PPS to a traffic responder may be designated as "outbound" with respect to the PPS. During the forward flow, in some embodiments, security rules may be evaluated for both inbound and outbound packets with respect to the PPS, e.g., using respective SRPNs for the inbound and outbound packets, or a single SRPN for both inbound and outbound packets. It is noted that in situations in which packets in both directions are processed by the PPS, the roles of traffic "origins" and "responders" may be switched depending on the direction—e.g., when an entity or device receives a packet from the PPS in the role of a responder, that same entity may subsequently send a packet to the PPS in the role of a traffic origin. In one embodiment, at least some of the PPS nodes used for packets transmitted in one direction (e.g., from a first set of hosts to a second set of hosts) may differ from the PPS nodes used for packets transmitted in the reverse direction (from the second set to the first set). For example, at least one node of the fast path processing tier, the flow state tracking tier and/or the decisions tier which participates in the process of transforming and/or routing packets flowing in one direction may not necessarily be used for packets flowing in the reverse direction. In some embodiments, at least at one of the PPS tiers, there may be no overlap between the respective fleets of nodes used for the different directions of traffic.

Two examples of the paths that may be taken when responding to a packet received at the fast path processing tier are indicated in FIG. 2 to help explain the respective functions of the different tiers. The arrows labeled "PNF" (pathway of a new flow), e.g., PNF-1, PNF-2, and the like represent the operations and messages that may result when the first packet of a particular flow (i.e., a flow for which a packet processing decision has not yet been generated) is received at the PPS. From among the FPPNs 220A—220Z, a particular subset may be selected for a given client's packet processing requirement. One of the nodes from the subset (e.g., FPPN 220D) may be selected for the first packet of a new packet flow originating at TO 212J, as indicated by the arrow PNF-1. FPPN 220D may examine a local cache of packet processing decisions (including security rule evaluation results), and determine that no entry applicable to the new flow exists in the cache. FPPN 120D may then identify a particular FSTN 230C of tier 242 to which a cache miss indicator is to be sent, as indicated by arrow PNF-2. A number of techniques such as client-based partitioning, IVN-based partitioning, shuffle-sharding and/or flow hashing may be used to select the particular node at each tier which should process a given flow.

Upon receiving the cache miss indicator PNF-2, FSTN 230C may discover that it too does not have any indication of a packet processing decision for the new flow, and may send a request for a decision (e.g., the equivalent of its own cache miss) to a selected decisions node (DN) 240B, as indicated by the arrow PNF-3. DN 240B may look up the details of the client requirement associated with the new flow (e.g., in a repository of mappings between packet source/destination addresses and packet processing requirements, by querying a control-plane component of the service being used to implement the targeted application at the traffic responders, or using other techniques). DN 240B may generate a new directive or rule representing a decision made for the packet's flow corresponding to the requirement. The directive may indicate various characteristics of the packet or packets to be generated for each received packet of the new flow—e.g., how many packets are to be transmitted for each received packet, the networking protocol to be used for the transmitted packet or packets, the destination address/port, which address and port combination is to be used if the source address information of the received packets is to be changed, and so on. In some embodiments, the DN 240B may submit a security rule evaluation request to a selected SRPN 251 (as indicated by arrow 292), and generate the directive only if the evaluation results indicate that further processing should proceed. In other embodiments, instead of the DN 240, the FSTN 230C may submit a security rule evaluation request (as indicated by arrow 291), and the FSTN 230C may only forward its request for a decision to the DN 240B if the security rule evaluation results indicate that further processing should proceed.

A representation of the newly-generated decision may be transmitted from DN 240B to a different DN such as 240C for replication in some embodiments. More than two replicas may be stored at respective DNs in some embodiments, e.g., to increase the resiliency of the PPS to failures. As indicated by arrow PNF-4, the DN at which the decision for the flow is made may transmit the representation of the decision back to FSTN 230C, where a local copy of may also be stored in at least some embodiments. In one implementation, the representation of decision may also be replicated at multiple nodes of tier 242. In the depicted embodiment, the directive may be transmitted to FPPN 220D (arrow PNF-5), and stored in a local cache at FPPN 220D. The received decision may then be implemented at FPPN 220D: for example, the packet that led to the cache miss may be dropped, or one or more output or transformed packets corresponding to the packet may be generated and transmitted to a selected destination (as indicated by arrow PNF-6). In some embodiments, a response to the transformed packet or packets may be received at the packet transformation tier (e.g., at FPPN 220D or at a different FPPN to which the response packet is directed from TR 213A). If transformations are required to the response packets, they may be applied (e.g., using one or more elements of the same decision that was generated earlier in response to the cache miss) at tier 241, and the transformed response packets may be sent on to the traffic origin TO 212J.

The second example pathway illustrated in FIG. 2 is for a packet of an established flow—i.e., a flow for which a decision has already been generated and propagated to one or more nodes of tier 241 at which the directive is to be applied. The arrows associated with this second flow are labeled PEF (pathway for established flow). As indicated by PEF-1, a packet of the established flow may be transmitted from a traffic origin 212K to FPPN 220E. There, an entry representing a packet processing decision for the flow may be found in the local cache. One or more outbound packets corresponding to PEF-1 may be generated according to the cached entry, and send to a destination TR 213B as indicated by arrow PEF-2; alternatively, the received packet may be dropped if the security rule evaluation indicated that the packet is not acceptable for further processing. If and when additional packets of the established flow are received at FPPN 220E, the decision may be reapplied, e.g., without further interactions with tiers 242 or 243.

In many cases, the processing decisions regarding a packet flow may be made when the first packet of the flow is encountered, and representations of the decisions may be retained in caches at the FPPNs for a sufficient period of time to handle numerous subsequent packets of the flow, without incurring the cost of consulting the other tiers for the subsequent packets. As such, in at least some embodiments, the vast majority of the packet processing work for the applications being implemented with the help of the PPS 202 may be performed extremely efficiently (e.g., using pre-compiled optimized programs representing the decisions reached at the decisions tier) at the FPPNs, thus justifying the term "fast-path" for the tier. The flow state tracking tier and the decisions tier may be referred to collectively as "slow-path" tiers in some embodiments. In one embodiment, the functionality of the FSTNs and DNs may be combined into nodes of a single slow-path processing tier (e.g., slow-path processing nodes of SPPNs, each of which is configured to track flow state information and also make packet processing decisions based on client-specified requirements).

In at least some embodiments, the FPPNs 220 may update metadata records corresponding to various flows (e.g., indicating when the most recent packet of a given flow was processed as well as various other parameters) and transmit the contents of the metadata records (either in raw form, or in some compressed/aggregated form) to the FSTNs 230, as indicated by arrows 275A. Such metadata updates or refresh messages may be sent periodically in some implementations, e.g., once every K seconds, or in response to metadata update requests from tier 242. Similarly, as indicated by arrow 275B, representations of flow state metadata records may be transmitted from tier 242 to tier 243 in at least some embodiments, and may be used at the DNs to make various choices required for the flows (e.g., the particular port or IP address to be used as a substitute for a source port, or a particular destination server to which the transformed packets of a load-balanced flow should be sent). For example, updated flow metadata may indicate to an DN that a particular (address, port) combination that was being used for a particular client's packet processing requirement is no longer in use because a connection has been closed, and that (address, port) pair may subsequently be used for some other packet processing requirement of the same client or another client.

In the embodiment shown in FIG. 2, PPS 202 may also include one or more health monitoring fleets 290. A health monitoring fleet may include one or more nodes that monitor the responsiveness and/or availability of various nodes of the different tiers 241, 242 and/or 243, and provide notifications regarding changes in the health states of the monitored nodes to other nodes. If a particular node such as DN 240A fails to respond to some number of consecutive heartbeat or health check messages, for example, a different node of the same tier such as 240B may be notified to take over some or all of DN 240A's responsibilities. In addition, one or more nodes of an adjacent tier (or all tiers) may also be notified regarding possible failures. Failover protocols may be initiated in some embodiments based on such indications received from the health monitoring fleets. In the embodiment depicted in FIG. 1, the PPS 102 may implement one or more control-plane programmatic interfaces 277 (e.g., application programming interfaces (APIs), web-based consoles, command-line tools, graphical user interfaces (GUIs) and the like) which may be used by clients to indicate various types of packet processing requirements, security rules and the like. The nodes at the various tiers of the flow management service may be implemented using compute instances (e.g., guest virtual machines hosted at a VCS) in some embodiments, and/or as un-virtualized machines.

Example Packet Flows

Figure 3:
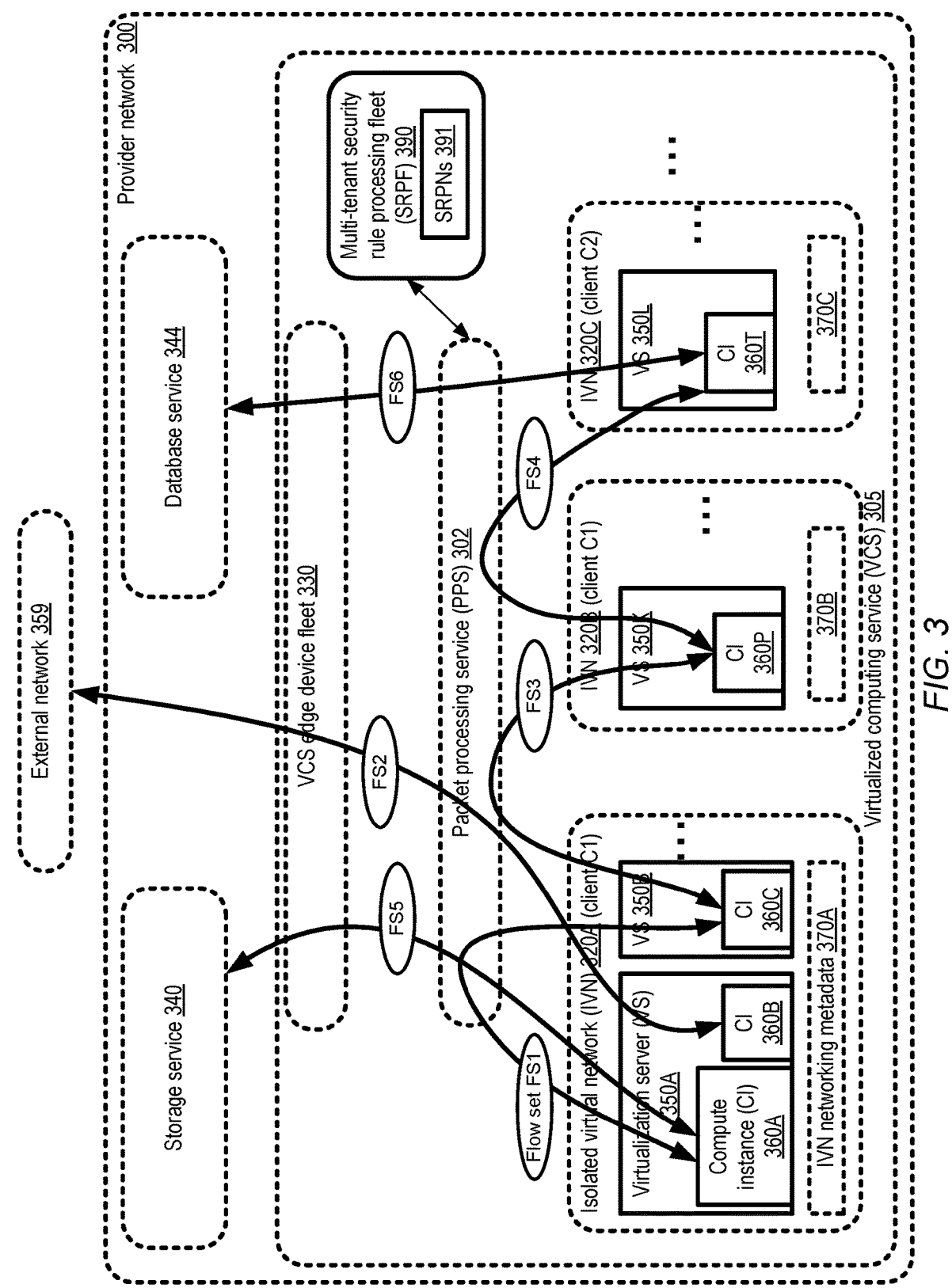
FIG. 3 illustrates examples of packet flows for which a security rule processing fleet may be utilized at a provider network, according to at least some embodiments.

FIG. 3 illustrates examples of packet flows for which a security rule processing fleet may be utilized at a provider network, according to at least some embodiments. As mentioned earlier, networks that provide one or more network-accessible services (such as various types of cloud-based computing, storage or analytics services) accessible via the Internet and/or other networks to a distributed set of clients may be termed provider networks in various embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries).

A packet processing service (PPS) 302 and an SRPF 390 comprising SRPNs 391 may be implemented as part of a virtualized computing service (VCS) at provider network 300 in the depicted embodiment. PPS 302 may include several tiers, similar in features and functionality to tiers 241, 242 and 243 of PPS 202 of FIG. 2. Similarly, SRPNs 391 may be organized into logical partitions, each comprising a plurality replica SRPNs as discussed in the context of FIG. 1. The VCS 305 may comprise a collection of virtualization servers 350, such as VS 350A, 350B, 350K and 350L, at each of which zero or more compute instances (CIs) 360 (such as guest virtual machines) may be running at a given point in time on behalf of VCS clients. For example, CIs 360A and 360B are running at VS 350A, CI 360P is running at VS 350K, and CI 360T is running at VS 350L.

At least some of the compute instances and other resources of the VCS 305 may be organized as a collection of isolated virtual networks (IVNs) 320 in the depicted embodiment. As indicated earlier, a given isolated virtual network, such as IVN 320A, 320B or 320C may comprise a collection of networked resources (including, for example, compute instances, virtualized and/or physical networking devices, hosts, etc.) allocated to a given client, which are logically isolated from (and by default, inaccessible from) resources allocated for other clients in other isolated virtual networks. The client on whose behalf an IVN is established may be granted substantial flexibility regarding network configuration for the resources of the IVN—e.g., private IP addresses for compute instances may be selected by the client without having to consider the possibility that other resources within other IVNs may have been assigned the same IP addresses, subnets of the client's choice may be established within the IVN, security rules may be set up by the client for incoming and outgoing traffic with respect to various virtual network interfaces configured at the IVN, and so on. Multiple IVNs may be set up on behalf of the same client in some embodiments. In the example scenario depicted in FIG. 3, IVNs 320A and 320B have been established for a client C1 of the VCS 305, while IVN 320C has been established for a different client C2. Note that although virtualization servers 350 are shown as hosting compute instances within a single IVN in FIG. 3, at least some virtualization servers may be utilized in multi-tenant mode in some embodiments—that is, a given VS 350 may be used for compute instances of several different clients and/or several different IVNs 320.

Clients of the VCS may utilize the compute instances 360 to run various types of applications in different embodiments. In some cases, the applications running at a given VS may communicate with resources elsewhere within the provider network 300, and/or resources outside the provider network 300, such as external network 359 (e.g., a network set up at a client-owned premise, or part of the public Internet). A compute instance may be programmatically attached to one or more virtual network interfaces (VNIs) in the depicted embodiment, while virtualization servers (and resources outside the VCS) may have physical network interface cards (NICs) configured. A given VNI may have one or more network addresses (e.g., Internet Protocol (IP) version 4 or version 6 addresses) assigned to it, and a NIC may also have one or more network addresses assigned to it. In order to transmit contents of packets from a CI 360 at a VS 350 to a destination external to the VS, an encapsulation protocol may be implemented at the VCS, which may be used to map VNI network addresses to physical NIC addresses (in addition to being used for other functions). In addition to network addresses, VNIs may also have client-specified security rules, e.g., to indicate permitted sources/ destinations of traffic of the CIs to which the VNIs are programmatically attached. For at least some network packet sequences sent from or directed to compute instances 360, packet processing actions such as load balancing, source address substitution or the like may be performed, e.g., with the help of the PPS 302 and SRPF 390. For example, some number of the CIs 360 may be collectively used to implement a particular application App1 of client C1, and App1 service requests may have to be load balanced among the CIs.

A packet flow comprising some number of packets may be transmitted between a given CI 360 and one or more traffic destinations or sources using a packet processing application at least in part at the PPS 302. A number of different example packet flow types are illustrated in FIG. 3; each flow may, for example, be distinguished from other flows based on an N-tuple comprising an identifier of a network protocol being used, a source network address, a source network port, a destination network address, and/or a destination network port. In some embodiments, the N-tuple used to uniquely identify a network packet flow may also comprise other elements such as an identifier of an IVN from which the packet originates, an identifier of a VNI used for the packets, or an indication of a direction of packet transmission. Flow set FS1 may comprise packets transmitted between CIs 360A and 360C within the same IVN 320A. Flow set FS2 may comprise packets sent between a CI 360B at IVN 320A and external network 359 (e.g., at a client data center or a co-location facility). Flow set FS3 may include packets sent between CIs at two IVNs of the same VCS client: IVN 320A and 320B, both set up on behalf of client C1. Flow set FS4 may include packets transmitted between IVNs of different VCS clients: IVN 320B of client C1 and IVN 320C of client C2. Flow set FS5 may comprise packets transmitted between CI 360A and a storage service 340 of the provider network 300, e.g., via a fleet of VCS edge networking devices 330. In some embodiments, if for example public IP addresses of compute instances are used as source and/or destination addresses, some packet flows between IVNs of the VCS may flow via the PPS and the edge networking devices 330 (instead of the PPS alone). Flow set FS6 may comprise packets transmitted between a CI 360T and a database service 344.

For each of these types of network flows, various types of IVN configuration settings included in IVN networking metadata 370 (e.g., metadata 370A, 370B or 370C), such as security rules for inbound or outbound traffic and/or network access control lists (NACLs) may be enforced efficiently and transparently at the PPS 302 in the depicted embodiment. Instead of evaluating the security rules within the nodes of the PPS itself, the PPS nodes may utilize SRPNs 391 to evaluate the security rules. Portions of the IVN networking metadata 370 may be automatically propagated to the SRPNs, e.g., from administrative or control plane components of the VCS 305, to enable the security rules to be evaluated at the SRPNs 391.

Example Categories of Packet Processing Applications

Figure 4:
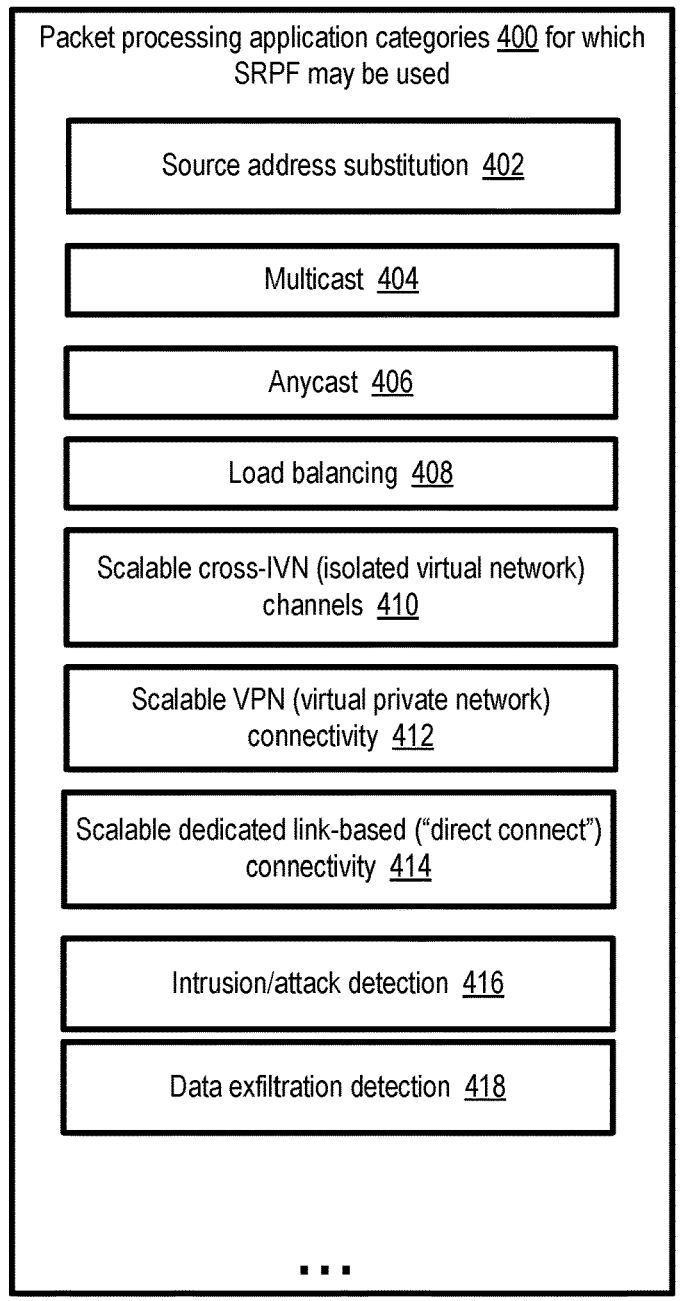
FIG. 4 illustrates example categories of packet processing applications, implemented at a packet processing service, for which security rules may be evaluated at a distributed fleet of nodes, according to at least some embodiments.

FIG. 4 illustrates example categories of packet processing applications, implemented at a packet processing service, for which security rules may be evaluated at a distributed fleet of nodes, according to at least some embodiments. In general, a packet processing service with capabilities similar to that of the PPS 202 shown in FIG. 2 may be configurable to implement any desired type of packet processing or transformations (or combinations of different types of packet processing or transformations), with nodes being assignable dynamically at each layer to support a large range of traffic rates in a transparent and scalable manner. For each of the example application categories 400, applicable security rules may be evaluated at an SRPF similar in features and functionality to SRPF 150 of FIG. 1 in at least some embodiments. Note that in some embodiments, a packet processing application for which an SRPF is used may not necessarily be implemented using a multi-tier service; instead, for example, a single-tier service may be used, or standalone packet processing servers may be used.

Source address substitution applications 402, as the name suggests, may involve replacing, for the packets of a particular flow, the source address and port in a consistent manner. Source address substitution techniques may be useful, for example, when an overlap exists between the private address ranges of two or more isolated networks, or when the actual addresses of one or more servers implementing a service using a load balancer are to be hidden from service consumers, and the PPS may be employed as the intermediary responsible for such substitutions in some embodiments. Such address substitution operations may also be referred to as "managed network address translation (NAT)" in some embodiments. Multicast 404 is a networking technique, implementable using a PPS in some embodiments, in which contents (e.g., the body) of a single packet sent from a source are replicated to multiple destinations of a specified multicast group. In contrast, anycast 406 may involve selecting, for all the packets of a given flow that are received at a PPS, a particular destination from among a specified set of destinations.

Load balancing 408, as indicated by the name, involved distributing packets among a set of servers so as to prevent server overloading. For scalable cross-IVN channels 410, the PPS may in effect be used as an intermediary between the private address spaces of two or more different IVNs in some embodiments. In at least one embodiment, a PPS may also or instead be used to support scalable VPN (virtual private network) connectivity 412 between some set of resources within a provider network and one or more client networks or client premises outside the provider network, or between multiple client-premises networks each linked via VPN connections to the SPPS. In some embodiments, a provider network may support connectivity with external networks via dedicated physical links called "direct connect" links, and scalable connectivity 414 between such external networks (and between such external networks and IVNs or VPN-connected external networks) may be managed using the PPS.

In at least some embodiments, the PPS may be used for intrusion or attack detection 416 (e.g., for detection of unexpected or unwanted traffic at resources of a particular business or governmental entity). Data exfiltration detection 418 (e.g., the detection of undesired/unauthorized transmission of data out of a network of an organization) may be performed using a PPS in some embodiments. Note that at least in some embodiments, a single application set up using a PPS and an SRPF may combine several of the packet processing functions indicated in FIG. 4 (and/or other packet processing techniques). Other categories of packet processing applications may be supported using a PPS and an SRPF in different embodiments, while some of the types of applications indicated in FIG. 4 may not be supported in some embodiments.

Example Network Security Rules

Figure 5:
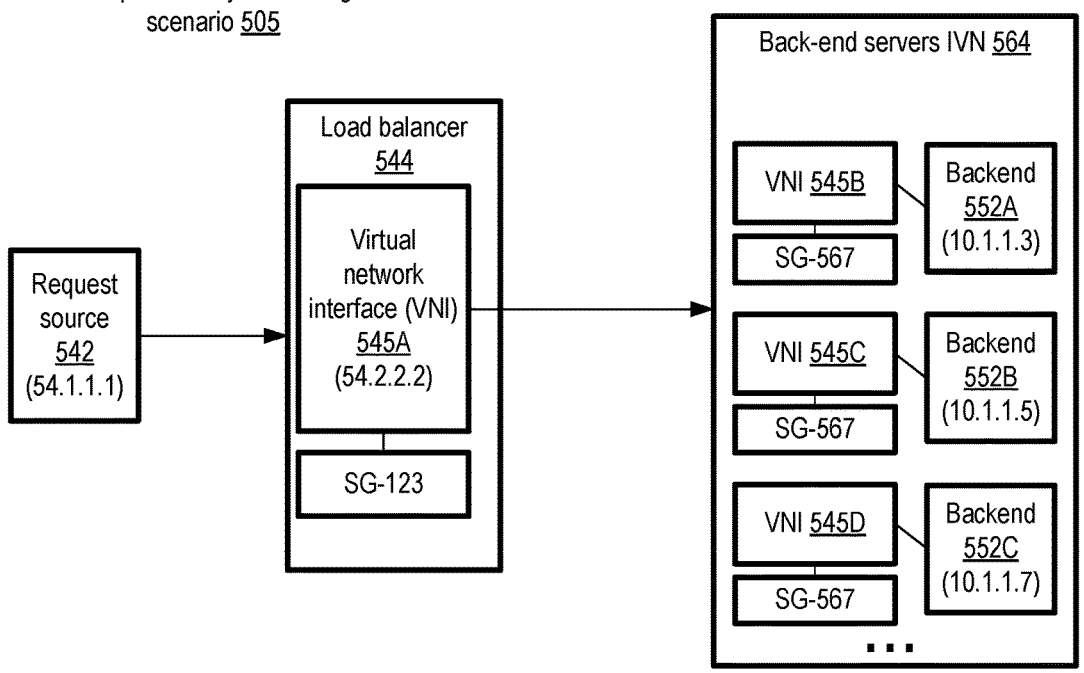
FIG. 5 illustrates an example set of security rules associated with a load balancing application, according to at least some embodiments.
Figure 5:
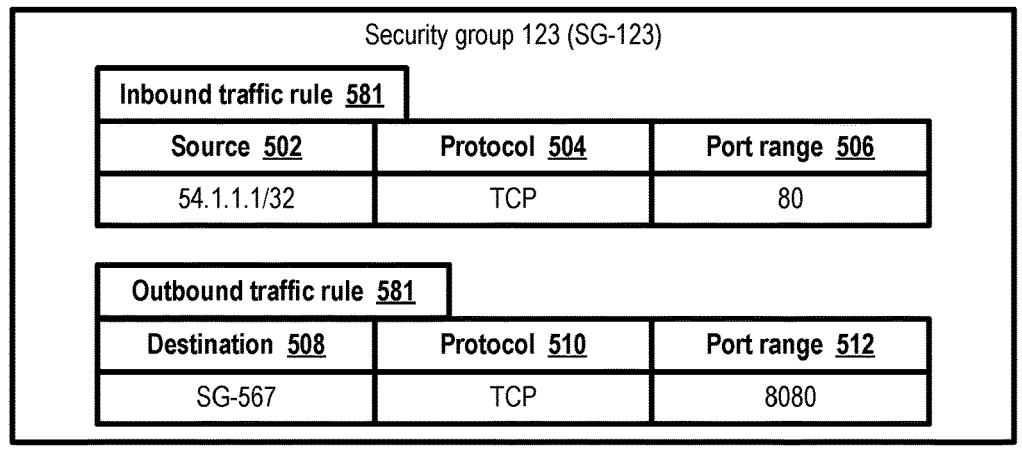

FIG. 5 illustrates an example set of security rules associated with a load balancing application, according to at least some embodiments. In example security rules usage scenario 505, a load balancer 544 is configured as a packet processing intermediary between a set of request sources 542 and a collection of backend servers 552 (e.g., 552A, 552B and 552C) of an IVN 564. A respective security group (SG) has been assigned to virtual network interfaces (VNIs) 545A-545D-, e.g., in response to programmatic requests from a client on whose behalf the load balancer has been configured. As mentioned earlier, a client of a provider network service such as a virtualized computing service may indicate one or more SGs for a VNI, and at least some of the SGs may include one or more security rules which can be evaluated with the help of a security rule processing fleet of the kind described earlier in the depicted embodiment. In at least some embodiments, in order to specify a security rule, a security group may first be created via a programmatic request; that is, each security rule may be defined within a parent security group, while a given security group may contain zero or more security rules at a given point in time. In other embodiments, security rules may be defined independently, without requiring a parent security group to be defined. In some embodiments, a security rule may be added to a security group after the security rule has been created in response to a programmatic request.

SG-123 is assigned to VNI 545A, which may be configured in multiplexed mode as the front-end interface of the load balancer (for example, traffic directed to a network address 54.2.2.2 of VNI 545A may be distributed among a plurality of fast path processing nodes (FPPNs) of the load balancer using additional VNIs attached to each of the FPPNs) in the depicted embodiment. Inbound traffic rule 581 includes a source descriptor 502 (indicating one or more sources from which incoming traffic is to be accepted), a networking protocol 504, and a destination port range 506. As shown, the CIDR notation 54.1.1.1/32 is used to specify the source whose traffic is to be load balanced, TCP is specified as the protocol, and port 80 is the only allowed destination port for traffic sent from the source. Outbound traffic rule 581 specifies a destination 508 as another SG (SG-567) for TCP packets (indicated via the protocol field 510), and indicates that 8080 is the only allowed destination port 512. In some embodiments, individual security rules of a security group may indicate allowed flows of packets, and flows that are not explicitly permitted by the security rules may be implicitly disallowed. In other embodiments, at least some security rules may instead indicate the flows that are not allowed, rather than the flows that are allowed. In at least one embodiment, an absence of a security rule for a particular direction (inbound or outbound) may indicate that all traffic is permitted in that direction.

SG-567 is assigned to VNIs 545B, 545C and 545D which are set up for the backend servers 552A (with IP address 10.1.1.3), 552B (with IP address 10.1.1.5) and 552C (with IP address 10.1.1.7) of IVN 564. SG 567 itself may include an inbound security rule allowing all traffic from the load balancer (or from SG-123). In at least some embodiments, when a packet is received at a backend server 552, the rules of the SG 567 may be evaluated locally at the server without utilizing the SRPF.

Generally speaking, sources and destinations for security rules of an SG may be specified in any of several different ways. For example, traffic sources or destinations may be specified using any of: (a) a range of network addresses, expressed in CIDR format (or a single network address), (b) an identifier of a security group configured for one or more virtual network interfaces, or (c) an identifier of a network-accessible service. In at least some embodiments, a provider network may support programmatic interfaces such as "CreateSecurityGroup" and "AddRuleToSG" to enable clients to request the creation of SGs with specified SG names (such as SG-123 or SG-567) and then to add rules to the created SGs. In one embodiment, separate programmatic interfaces may be supported for adding rules for inbound versus outbound traffic: e.g., "AddIngressRuleToSG" may be supported for adding rules for inbound traffic, and "AddEgressRuleToSG" may be supported for adding rules for outbound traffic.

Example Message Sequences Associated with Processing Security Rules

Figure 6:
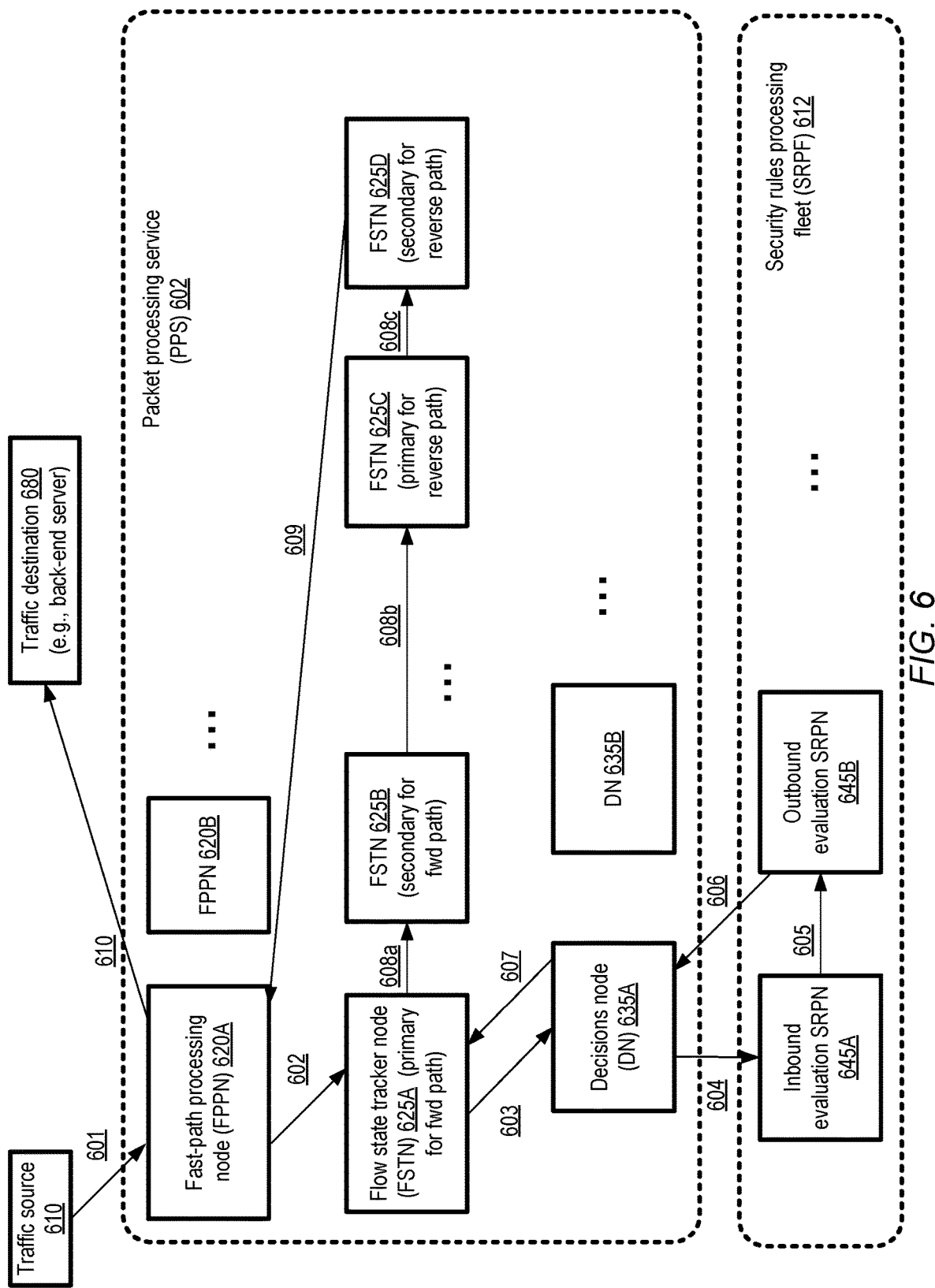
FIG. 6 illustrates an example message sequence associated with evaluating security rules for a packet flowing in a forward direction between one traffic endpoint and another traffic endpoint via a packet processing service, according to at least some embodiments.

FIG. 6 illustrates an example message sequence associated with evaluating security rules for a packet flowing in a forward direction between one traffic endpoint and another traffic endpoint via a packet processing service, according to at least some embodiments. In the embodiment depicted in FIG. 6, packet processing service (PPS) 602 may comprise three tiers of nodes, similar to the tiers of PPS 202 discussed in the context of FIG. 2. The fast-path processing tier may include fast-path processing nodes (FPPNs) 620A and 620B, the flow state tracking tier may include flow state tracker nodes (FSTNs) 625A-625D, and the decisions tier may include decisions nodes 635A and 635B in PPS 602.

A packet of a particular flow (e.g., a flow whose messages contain service requests directed to a load balancer being implemented using the PPS 602, similar to load balancer 544 of FIG. 5) may be received at a particular fast-path processing node (FPPN) 620A in the depicted embodiment from a traffic source 601, as indicated by arrow 601. As mentioned earlier, any of a number of techniques such as client-based partitioning, IVN-based partitioning, shuffle-sharding and/or flow hashing may be used to select the particular node at each tier which should process a given flow. The FPPN 620A may discover that it does not have pre-cached information indicating the actions to be performed for the received packet, so the FPPN 620A may select a particular FSTN 625A as the target for a query (indicated by arrow 602) regarding the action to be taken for the packet. (If the FPPN 620A already has a cached representation of the action to be performed, it may simply implement the action, e.g., by forwarding the packet on to a traffic destination 680.)

If the FSTN 625A also does not have a cached representation of the action, it may forward the query (arrow 603) to a selected decisions node (DN) 635A in the depicted embodiment. If the DN 635A does not have a previously-generated action, representing a decision that was taken earlier for the same flow, the DN 635A may submit a rule evaluation request (which may include the original packet received at the FPPN 620A, as well as some additional metadata such as identifiers of source and destination IVNs of the packet, VNIs being used for the packet processing application, the client on whose behalf the packet was sent to the PPS, and so on) to an SRPN 645A of a security rules processing fleet 612 in the depicted embodiment. SRPN 645A may identify (using the metadata provided by the DN 635A, as well as the networking configuration information propagated to the SRPN from the control plane of a VCS and/or other services earlier) one or more security rules for inbound traffic directed to a virtual network interface (VNI) of the PPS application (e.g., a load balancer), and then evaluate the rules. In some embodiments, as mentioned earlier, highly optimized executable versions of the applicable rules may be generated and/or obtained at the SRPNs (e.g., in eBPF byte code), so that the evaluation of the applicable rules is extremely quick. Note that at least in some embodiments, numerous security groups, each in turn comprising numerous security rules, may be created for a given VNI at the request of a client. In one implementation, a code generator (e.g., running at the SRPN) may determine, based on various optimization factors, the sequence in which individual rules of a security group are to be evaluated, or whether some of the rules are to be evaluated in parallel. In some implementations, the evaluation of several different security groups applicable to a given flow may be performed in parallel, e.g., using several different threads of execution at an SRPN such as 645A; in other implementations, the different security rules may be evaluated sequentially.

In the embodiment depicted in FIG. 6, the evaluation of security rules for outbound traffic (e.g., packets to be sent from the PPS 602 towards traffic destinations 680 in response to the packet received from source 610) may be performed at a different SRPN 645B than was used for evaluating rules for inbound traffic. The inbound evaluation SRPN 645A may send a message 605 (which includes the contents of the evaluation query received at SRPN 645A, as well as the results of the inbound rule evaluation performed by the SRPN 645A) to outbound evaluation SRPN 645B. There, the applicable outbound rules may be identified and evaluated using efficient executable representations of the rules as were used at SRPN 645A, and the results of the outbound as well as inbound rule evaluations may be sent via message 606 to the DN 635A. The DN 635A may store a copy of the evaluation results in a local cache. The evaluation results, as well results of as any additional packet processing decisions made at DN 635A, may be sent in message 607 to FSTN 625A in the depicted embodiment. In some embodiments, depending for example on whether the source and destination of the packet are within different IVNs or not, security rules may be evaluated for both directions at a single SRPN. For example, in one embodiment, the SRPN used for rule evaluation may be selected based at least partly on the source IVN of a packet, so if the source and destination of the received packet for the forward path are in different IVNs, distinct SRPNs may be selected for the two directions of traffic.

In some embodiments, multiple FSTNs 625 may be used to store the decisions and evaluation results, as well as flow state information and metadata, for a given flow. For example, for both the forward path and the reverse path of a bi-directional sequence of messages (which may be processed at a load balancer implemented at the PPS), a respective primary and a secondary FSTN may be identified in the depicted embodiment. FSTN 625A may be designated as the primary for the forward path, FSTN 625B may be designated as the secondary for the forward path, FSTN 625C may be designated as the primary for the reverse path, and FSTN 625D may be designated as the secondary for the reverse path. The contents of the message 607 may be replicated via messages 608a, 608b and 608c, among all four FSTNs, and also forwarded to FPPN 620A via message 609. At FPPN 620A, a representation of the decisions made at the SRPF and the DN may be cached, and a routing action based on the decisions may be implemented, e.g., by sending the original packet (or a transformed version thereof) to a traffic destination 680 such as a back-end server for which a load balancer was configured using PPS 602.

Figure 7:
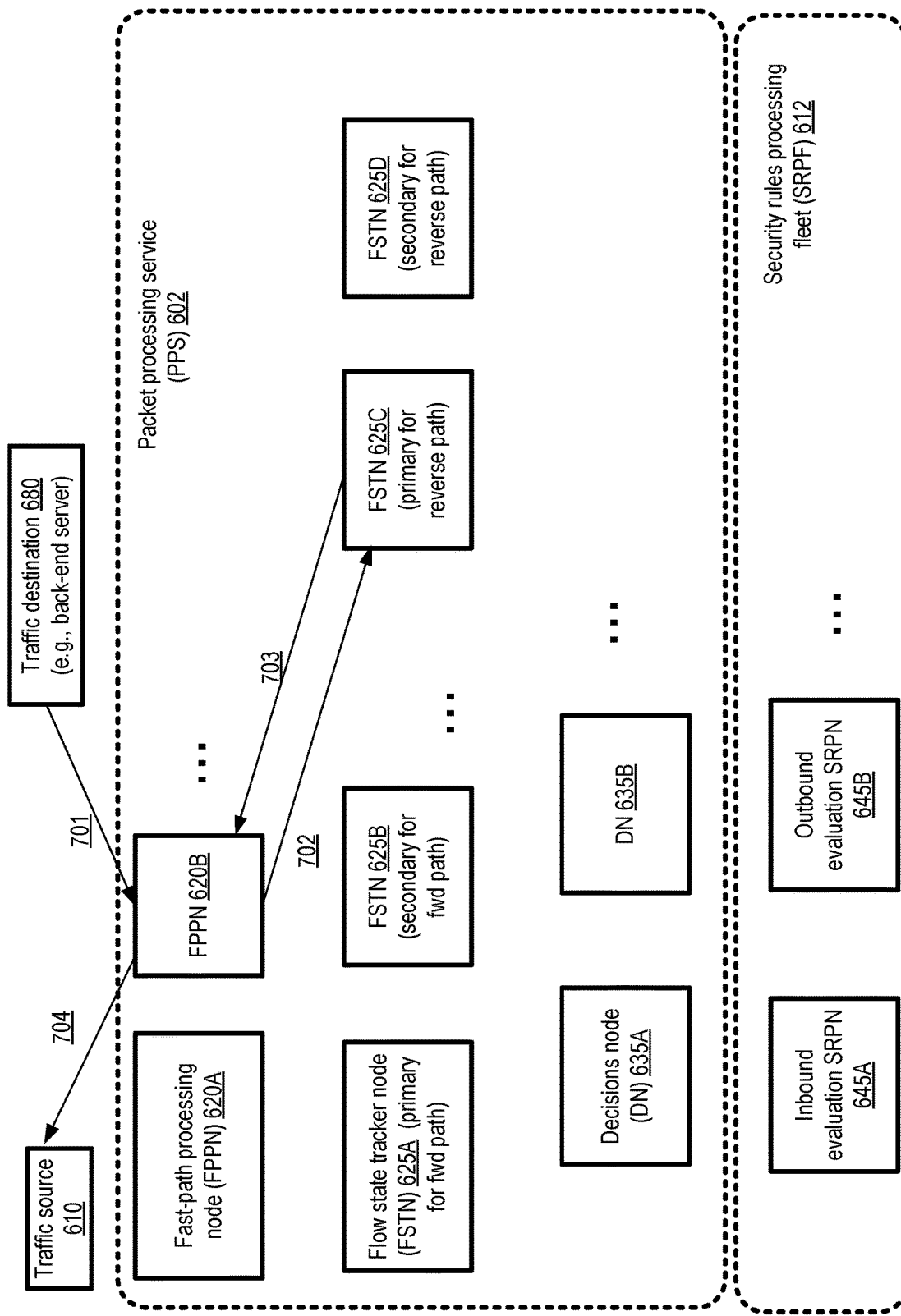
FIG. 7 illustrates an example message sequence associated with evaluating security rules for a packet flowing in a reverse direction between one traffic endpoint and another traffic endpoint via a packet processing service, according to at least some embodiments.

FIG. 7 illustrates an example message sequence associated with evaluating security rules for a packet flowing in a reverse direction between one traffic endpoint and another traffic endpoint via a packet processing service, according to at least some embodiments. The operations illustrated in FIG. 7 may be performed with respect to packets sent in the reverse direction to that illustrated in FIG. 6; as such, FIG. 7 continues the description of traffic corresponding to the packet originating at traffic source 610, after that packet is received at its destination and a response is generated at the destination. Such a response packet 701 may be received at FPPN 620B of PPS 602 in the depicted embodiment. If a cached entry indicating the action to be taken for the packet is not found at FPPN 620B, the FPPN may send a query 702 including the packet to FSTN 625C (the primary FSTN designated for the reverse path, as discussed in the context of FIG. 6). FSTN 625C may find a local cache entry that indicates the actions to be taken for packets sent in the reverse direction, (which may have been stored in the cache in response to receiving message 608B of FIG. 6).

The contents of the FSTN 625C cache entry as well as the packet received from traffic destination 680 may be provided to FPPN 620B (arrow 703), where they may also be cached, and the routing actions indicated in the cache entry may then be implemented at FPPN 620B, resulting in the transmission of a packet to traffic source 610 (as indicated by arrow 704). Messages need not be sent to the decisions nodes (DNs) or to the SRPNs for the reverse direction packet processing in the depicted embodiment.

Figure 8:
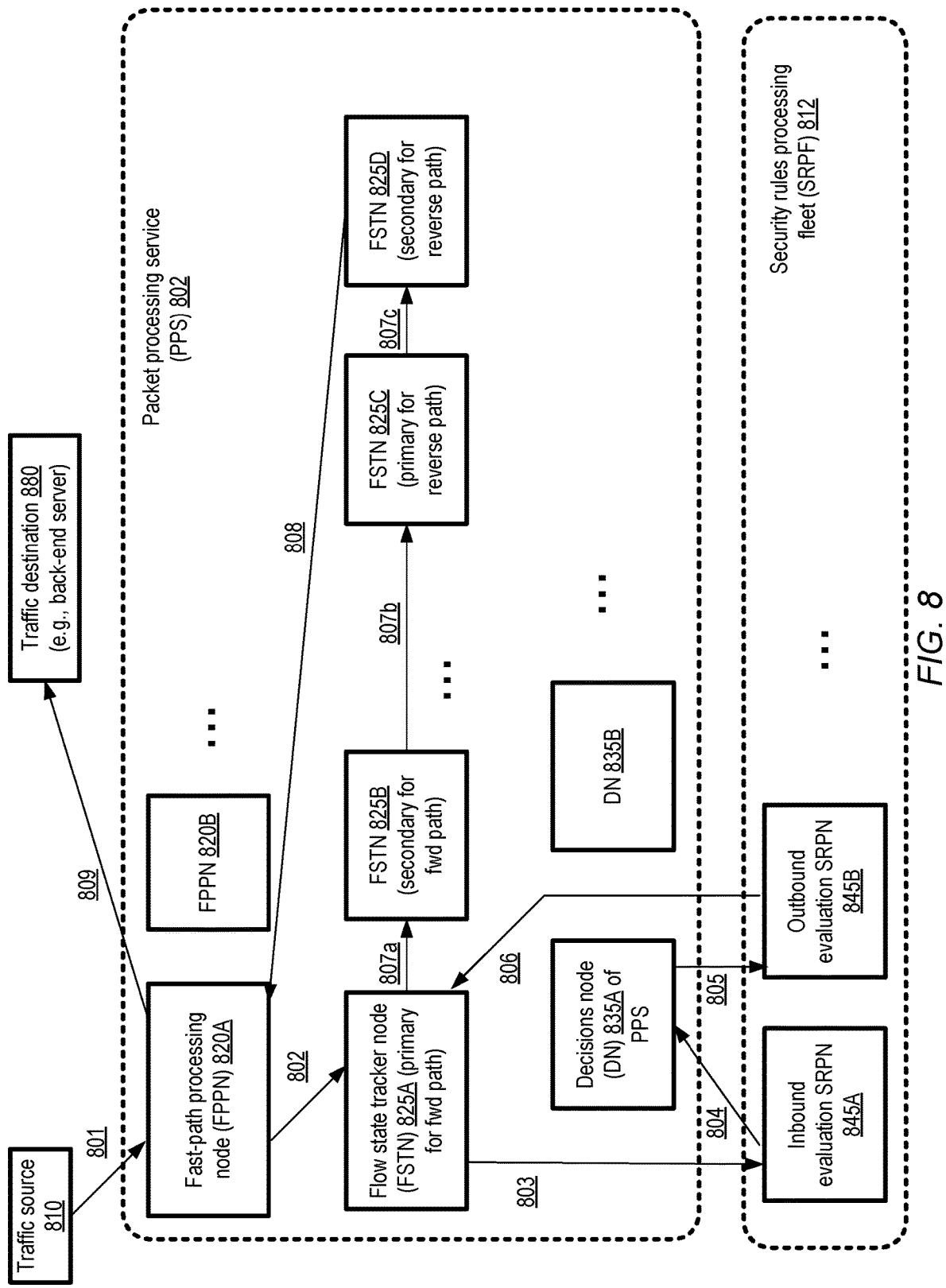
FIG. 8 illustrates an alternative example message sequence associated with evaluating security rules for a packet flowing in a forward direction between one traffic endpoint and another traffic endpoint via a packet processing service, according to at least some embodiments.

In some embodiments, a slightly different approach may be taken with respect to the sequence of messages between the FSTNs, the DNs and the SRPNs than that shown in FIG. 6 for processing the forward direction traffic. FIG. 8 illustrates an alternative message sequence dataflow associated with evaluating security rules for a packet flowing in a forward direction between one traffic endpoint and another traffic endpoint via a packet processing service, according to at least some embodiments. As in FIG. 6, a packet of a flow may be received (arrow 801) at an FPPN 820A of a PPS 802, and a corresponding query 802 may be sent to a selected FSTN 825A designated as the primary FSTN for the forward path. However, instead of forwarding the query to a DN as in FIG. 6, the FSTN 825A may send an evaluation request 803 to a selected SRPN such as 845A of the SRPF 812 for inbound traffic rule evaluation.

The inbound evaluation SRPN 845A may identify the applicable security rules, evaluate the rules, and send the results of the evaluation in message 804 to a selected DN such as 835A in the approach depicted in FIG. 8. The DN may send a security rule evaluation request 805 for the outbound traffic rules to an outbound evaluation SRPN 845B. The results of both inbound and outbound rule evaluations, as well as any addition decisions reached at the DN 835A, may be sent from the outbound evaluation SRPN 845B back to FSTN 825A as indicated by arrow 806. The remaining messages of the sequence (e.g., the replication of the rule evaluation result and the decisions made by the DN at three more FSTNs via messages 807*a*, 807*b* and 807*c*, the transfer of the results to the FPPN 820A via message 808, and the transfer 809 of the packet received from the source 810 to a destination 880) may be similar to the messages shown in corresponding portions of FIG. 6. The approach taken in FIG. 8 may have an advantage relative to FIG. 6 in that fewer messages in total may be required than in the approach of FIG. 6 to process the received packet. For example, while DN 635A of FIG. 6 has to process two received messages, DN 835A of FIG. 8 has to process only one received message. One potential disadvantage of the approach shown in FIG. 8 is that both the FSTNs and the DNs may have to be informed about the SRPNs (e.g., addresses of the FRPNs may have to be propagated to FSTNs as well as DNs), whereas only the DNs have to be informed about the FRPNs in the approach of FIG. 6.

Example Mapping Techniques to Select SRPNs

Figure 9:
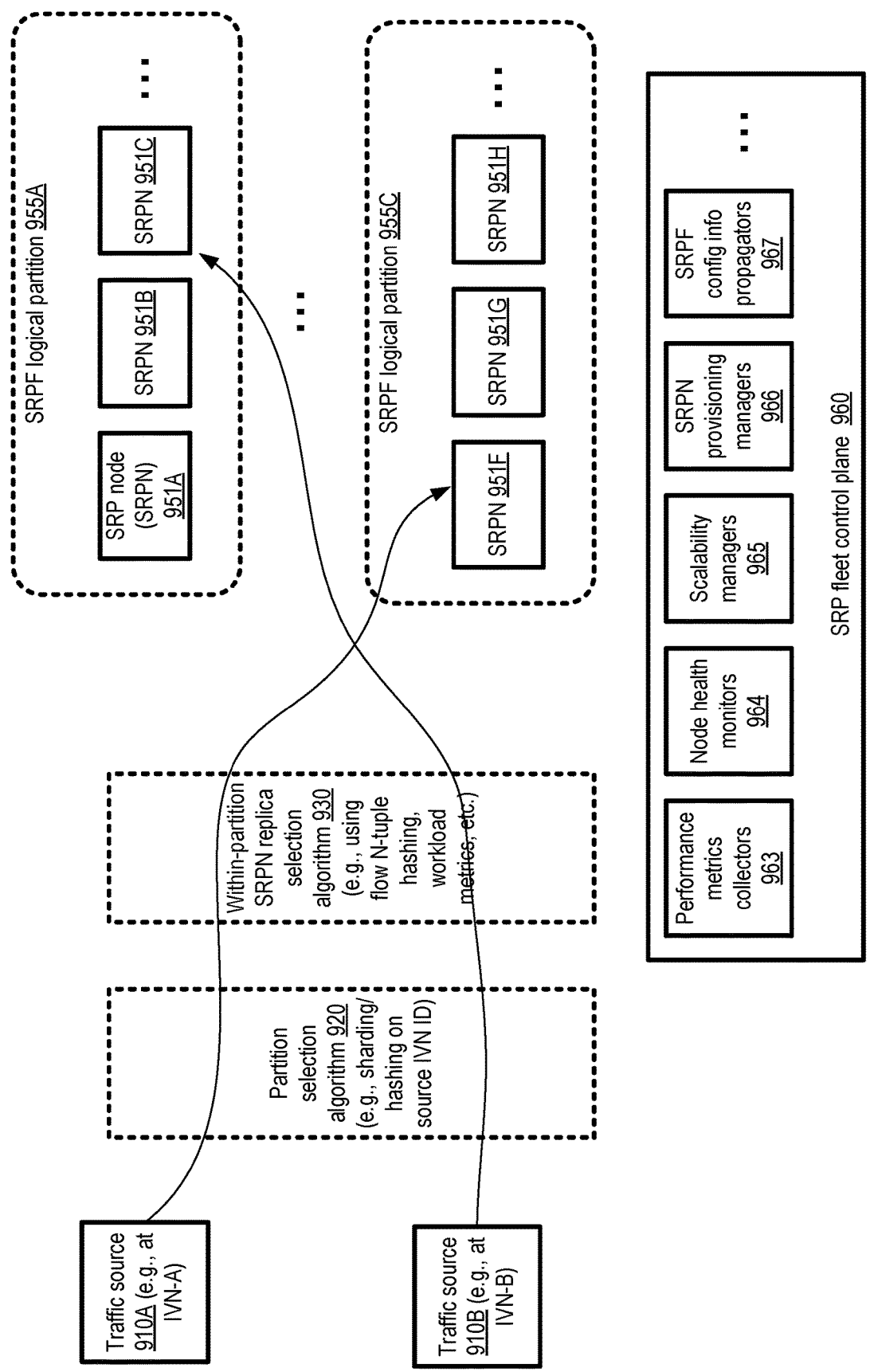
FIG. 9 illustrates an example mapping technique to identify security rule processing nodes for individual packets, according to at least some embodiments.

FIG. 9 illustrates an example mapping technique to identify security rule processing nodes for individual packets, according to at least some embodiments. In the depicted embodiment, a partition-selecting algorithm 920 may be used to select an SRPF logical partition 955 for evaluating security rules pertaining to a received packet, and then a within-partition replica selection algorithm 930 may be used to select a particular SRPN of the logical partition 955. In some cases each of the algorithms 920 and 930 may include invocations of one or more functions.

In at least some embodiments, if the traffic for whose packets security rules are to be evaluated is generated at an isolated virtual network (IVN) of the kind discussed earlier, one or more hash functions applied to an identifier of the IVN may be used for logical partition selection. Thus, for packets from a traffic source 910A within IVN-A, the hash functions maybe provided IVN-A's identifier (e.g. a unique string generated at the VCS) as input, and the output may comprise an index into the list of SRPF logical partitions. In the example scenario shown in FIG. 9, logical partition 955A is selected for traffic from IVN-A, while logical partition 955C is selected for traffic from source 910B at IVN-B. One advantage of such an IVN-based partition selection algorithm 920 (which may also be used for distributing network configuration information as discussed earlier) is that the configuration information for a given IVN may only have to be propagated to the SRPNs of a single logical partition in the depicted embodiment. If the traffic is not generated at an IVN, other properties of the packet flow, such as an identifier of a client on whose behalf the flow is being transmitted, or an identifier of a virtual network interface from which the flow's packets are received, may be used for logical partition selection in various embodiments.

Within the selected logical partition, in some embodiments flow hashing on an N-tuple of the packet (e.g., comprising elements such as source and destination addresses and ports) for which security rules are to be evaluated may be used to select the particular replica SRPN to be used. Thus, for the packets of the example flows indicated in FIG. 9, replica SRPN 951C of logical partition 955A may be selected as the target SRPN for the packets from source 910A, while replica SRPN 951F of logical partition 955C may be selected as the target SRPN for the packets from source 910B.

In at least some embodiments, a set of control plane components 960 may be responsible for administrative operations pertaining to the SRPF. Such control plane components may include, for example, performance metrics collectors 963, node health monitors 964, scalability managers 965, SRPN provisioning managers 966, and SRPF configuration information propagators in the depicted embodiment. Various types of metrics, such as resource utilizations at the physical or virtual machines used for the SRPNs (including CPU utilization, memory utilization and the like), security rule lookup times (e.g., the time taken at an SRPN to identify the set of security rules applicable for a flow), security rule evaluation times, times taken for generating executable code for rule evaluation, and so on, may be obtained at the performance metrics collectors 963 in different embodiments and used to make SRPF reorganization decisions as needed (e.g., by the scalability managers 965). Node health monitors 964 may be configured to send periodic health check messages to the SRPNs, and detect if and when an SRPN becomes unresponsive or fails (in which case replacement SRPNs may be instantiated, e.g., with the help of SRPN provisioning managers 966) in the depicted embodiment. The provisioning managers 966 may be responsible for acquiring the physical and/or virtualized resources used for the SRPNs 951, e.g., via programmatic interfaces of a VCS of the kind discussed above. In some embodiments, a respective compute instance of a VCS may be used for each SRPN 951; in other embodiments, multiple SRPNs 951 may be instantiated within a single physical machine or compute instance. In some embodiments, each SRPN 951 may be run on a respective (physical) server or host, while in other embodiments, multiple SRPNs 951 may be co-located on the same physical server or host. Each SRPN 951 may be assigned a respective network address (e.g., a network address assigned to a VNI attached to the compute instance used for the SRPN) in the depicted embodiment. Details of the configuration of the SRPF (e.g., the number of logical partitions 955, the number and addresses of the SRPNs 951 within each partition, etc.) may be distributed by one or more configuration information propagators 967 in the depicted embodiment, e.g., to nodes at the decision tier and/or the flow state tracking tier of a packet processing service, and/or to other types of packet processing intermediaries which may utilize the SRPF.

Example SRPF Scalability Techniques

Figure 10:
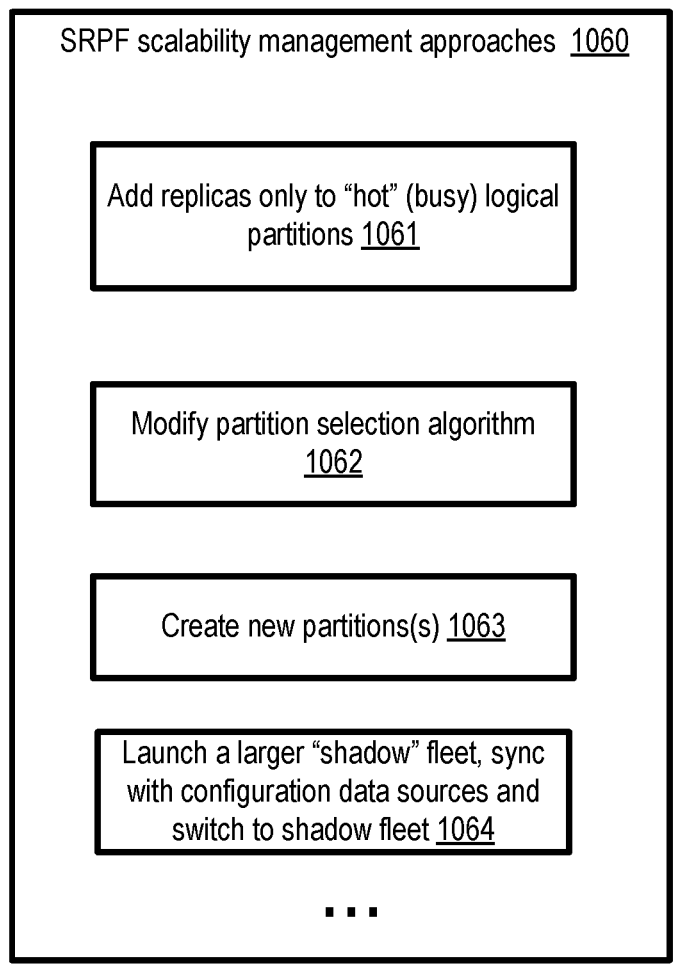
FIG. 10 illustrates example scalability management techniques for a distributed fleet of security rule processing nodes, according to at least some embodiments.

As the packet processing workload at a provider network changes over time, the corresponding rule processing requirements may also change. FIG. 10 illustrates example scalability management techniques for a distributed fleet of security rule processing nodes, according to at least some embodiments. Four scalability management approaches 1060 which may be implemented by scalability managers of the SRPF (similar to scalability managers 965 of FIG. 9) are indicated in FIG. 10 by way of example: adding replicas to busy partitions 1061, modifying partition selection algorithms 1062, adding new partitions 1063, and switching to larger "shadow" SRPFs 1064. Other techniques may be employed in some embodiments, or a combination of the techniques indicated in FIG. 10 may be used.

In approach 1061, the SRPF control plane may use collected metrics (e.g., SRPN resource utilization levels, throughputs, etc.) to determine if/when conditions at a given logical partition LP1 meet or exceed a partition expansion triggering threshold. For example, if LP1 contains N SRPNs, and the average CPU utilizations across the N SRPNs exceeds P % over a recent interval of T minutes, one or more additional SRPNs may be instantiated for LP1, while leaving other partitions which do not meet the expansion triggering threshold unchanged. In this scheme, the sizes of the different logical partitions may change over time, with larger partitions being used for security rule processing for traffic sources/destinations with higher levels of traffic. In at least one embodiment, just as SRPNs may be added based on how "hot" or busy a partition is, SRPNs may also be removed or decommissioned if their workload shrinks over time. In one embodiment, instead of adding new SRPNs to a "hot" partition, some or all of the SRPNs of such a partition may be migrated or transferred to servers with greater computing capacity than the servers being used currently. SRPFs in which all the logical partitions have the same number of SRPNs, with each SRPN having the same performance capacity, may be termed "symmetric" SRPFs. SRPFs in which the number or types of SRPNs at some partitions differ from the number or types of SRPNs at other logical partitions may be termed "asymmetric" SRPFs. Approach 1061 would thus permit asymmetric SRPFs.

In some cases, adding SRPNs to a busy partition may not be optimal. For example, consider a scenario in which the bottleneck resource at a particular logical partition is the amount of memory needed to store the networking configuration information (security rules, mappings between IVNs and security groups/VNIs, etc.) at each SRPN of the partition, while memory does not appear to be a bottleneck at one or more other logical partitions. Recall that the configuration information may be replicated at each SRPN of the partition in at least some embodiments. If servers with larger memories are not available for the SRPNs, any new SRPN added to the partition may suffer from the same memory bottleneck, since it too would have to store the same amount of configuration information in the same amount of memory as the other SRPNs. In such a scenario it may be helpful to modify the partition selection algorithm as indicated in approach 1062, so that some of the configuration information no longer has to be stored at the logical partition which is short on SRPN memory. As a result of such a change (e.g., changing the sets of inputs provided to hash functions, or using a different set of hash functions), the networking configuration information may be distributed more evenly among all the logical partitions, thus potentially resolving the memory bottlenecks.

In another approach 1063 used in at least one embodiment, instead of adding SRPNs to a single "hot" partition at a time, one or more new partitions may be configured at a time in response to metrics obtained from the SRPF. In such cases, the partition selection algorithm may also be modified to enable the redistribution of network configuration information among the combination of the old partitions and the new partitions. In some implementations, when a new partition is added to a symmetric SRPF, the new partition may also include the same number of replicas as the original partitions, thus retaining symmetry. In other implementations, a newly-added partition may not necessarily include the same number of replicas as previously-existing partitions.

In a third approach 1064, it may be simpler from an operational perspective to launch a symmetric but larger SRPF (termed a "shadow" fleet), e.g., with more SRPNs per partition, more performant SRPNs and/or more logical partitions. The term "shadow" may be used to refer to such a fleet because connectivity to the newly-configured SRPNs may not initially be established from the packet processing service or intermediaries, which may still continue to use the existing SRPF while the new SRPF is in the process of being populated with configuration information. All the nodes of such a shadow fleet may be provided with a respective relevant subset of the network configuration information. After the shadow fleet has synchronized with the configuration data sources, the security rule evaluation request streams from the packet processing intermediaries may be switched to the new larger SRPF in some embodiments.

Example Use of SRPFs During Compute Instance Migration

Figure 11:
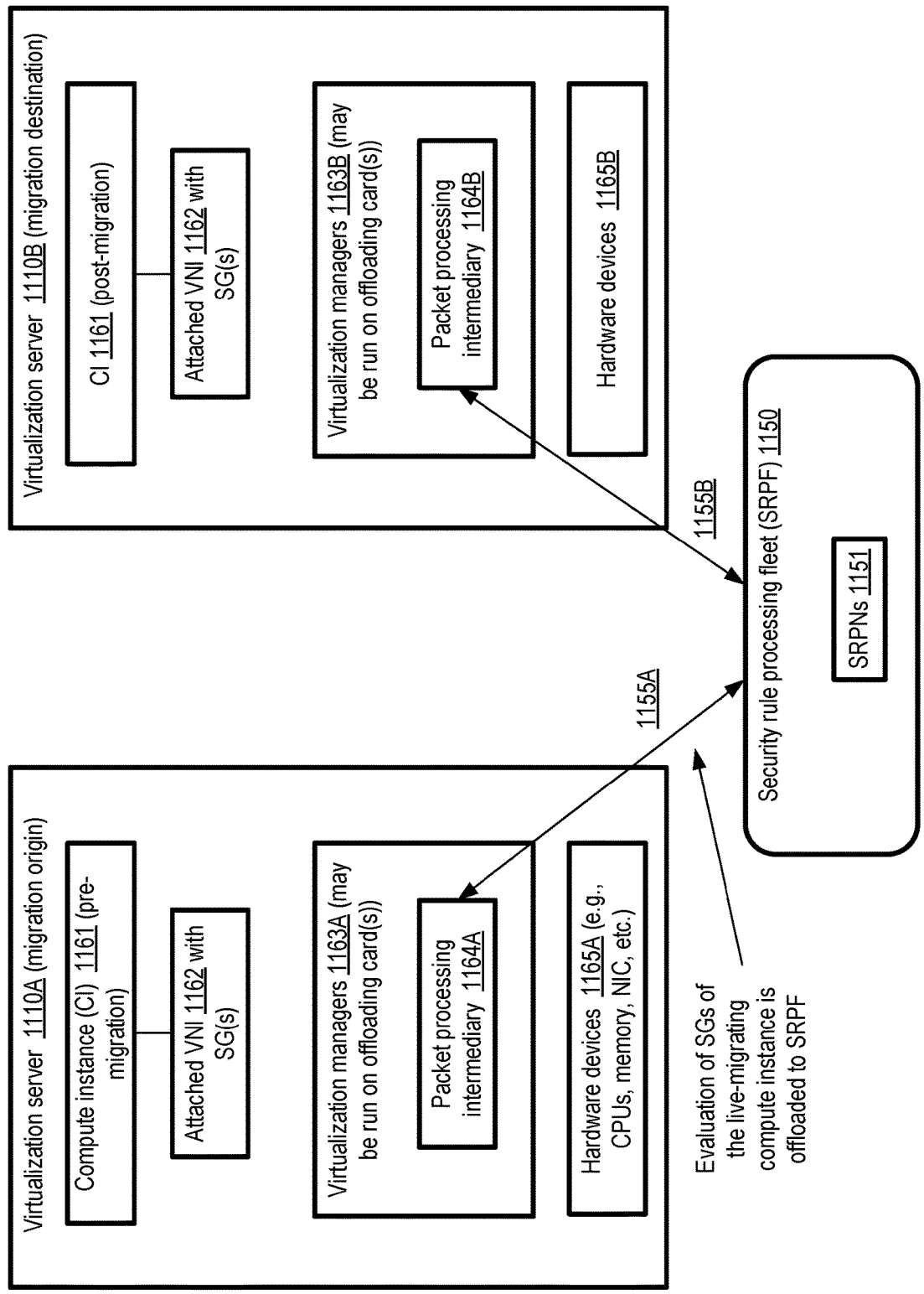
FIG. 11 illustrates an example scenario in which a distributed security rule processing fleet may be employed for traffic of a compute instance during an instance migration, according to at least some embodiments.

In some embodiments, SRPFs of the kind introduced earlier may be employed on behalf of entities other than nodes of a multi-tier packet processing service. FIG. 11 illustrates an example scenario in which a distributed security rule processing fleet may be employed for traffic of a compute instance during an instance migration, according to at least some embodiments. In the embodiment depicted in FIG. 11, a compute instance 1161, initially running a virtualization server 1110A of a virtualized computing service (VCS), is migrated to a different virtualization server 1110B of the VCS. Virtualization server 1110A may be referred to as the migration origin, and virtualization server 1110B may be referred to as the migration destination. Any of a number of reasons may lead to such a migration—e.g., the migration may be initiated because migration origin server 1110A is overloaded, because of an anticipated maintenance event at server 1110A, because co-location of the compute instance 1161 with other compute instances at destination server 1110B may be beneficial for latency reasons, and so on. In at least some embodiments, the migration shown in FIG. 11 may be termed a "live" migration, because the compute instance is expected to remain responsive and accessible via network connections during the process of migration.

A VNI 1162 may remain programmatically attached to the CI 1161 in the depicted embodiment, prior to, during, and after the migration. One or more security groups (SGs) of the kind discussed earlier may be defined for the VNI 1162, and may be used to control the sources of packets that the CI 1161 is allowed to accept, and the destinations of packets to which the CI 1161 is allowed to send packets. The VNI may be assigned one or more network addresses (e.g., IPv4 or IPv6 addresses), which may differ from the network addresses assigned to the network interface card(s) (NICs) of the virtualization servers 1110A and 1110B. The NICs of the virtualization servers may be configured as part of a "substrate" or physical network of the VCS, while the addresses assigned to the VNI and hence to the CI may be part of the address range of a logical network built on top of the substrate, such as an address range defined for an IVN in the depicted embodiment.

One or more virtualization management components, collectively referred to as virtualization managers 1163 (e.g., virtualization managers 1163A of server 1110A, and virtualization managers 1163B of server 1110B) may serve as intermediaries between the hardware devices 1165 (e.g., 1165A or 1165B) of the servers, and the compute instance 1161. Such hardware devices 1165 may include, for example, one or more CPUs, memory, GPUs (graphical processing units), storage devices, peripheral devices, and the like. In at least one embodiment, some of the virtualization management logic may be run at one or more offloading cards, e.g., a card comprising one or more systems-on-chip that can perform network virtualization operations, storage virtualization operations or the like. The use of such offloading cards may enable more of the computing power of the virtualization servers to be dedicated to compute instances.

In order to enable traffic to flow to and from entities (such as CI 1161) of the logical networks (such as IVNs) of the VCS over the hardware devices of the substrate network, an encapsulation protocol may be implemented in various embodiments, e.g., at packet processing intermediaries 1164. The virtualization managers 1163 may comprise such packet processing intermediaries 1164 in the depicted embodiment; that is, part of the virtualization management tasks performed at the virtualization servers may include processing network packets sent to or from compute instances of the virtualization servers. For example, a baseline packet to be transmitted from CI 1161 to another CI at another virtualization server may be incorporated within an encapsulation packet, with the headers of the encapsulation packet using substrate network addresses rather than logical network addresses so that the packet can be routed correctly as it traverses the substrate network. The baseline packet may be extracted from the encapsulation packet by a similar packet processing intermediary at the destination server in accordance with such an encapsulation protocol.

In the embodiment depicted in FIG. 11, such packet processing intermediaries 1163 which are part of the virtualization management infrastructure of the servers 1110, may offload the evaluation of security rules and groups to an SRPF 1150 with SRPNs 1151 during at least some phases of the migration of the compute instance, as indicated by arrows 1155A and 1155B. For example, the migration may comprise several phases in one embodiment, during some of which traffic directed to/from the compute instance 1161 may be processed at either the migration origin server 1110A or the migration destination server 1110B. As a result, in order to evaluate the security rules applicable to the traffic, the same configuration information may need to be consistently accessed from the virtualization managers at both servers 1110A and 1110B. By utilizing the SRPF 1150, the overhead of replicating configuration information at both the origin and destination virtualization servers may be avoided, and the amount of work that has to be done at the virtualization managers 1163 during migration may be reduced, thereby potentially speeding up other tasks performed during migration. SRPFs may also be used in other scenarios in some embodiments, e.g., as a general-purpose offloading technique to reduce the virtualization management overhead incurred at virtualization servers.

Methods for Distributed Networking Security Rule Processing

Figure 12:
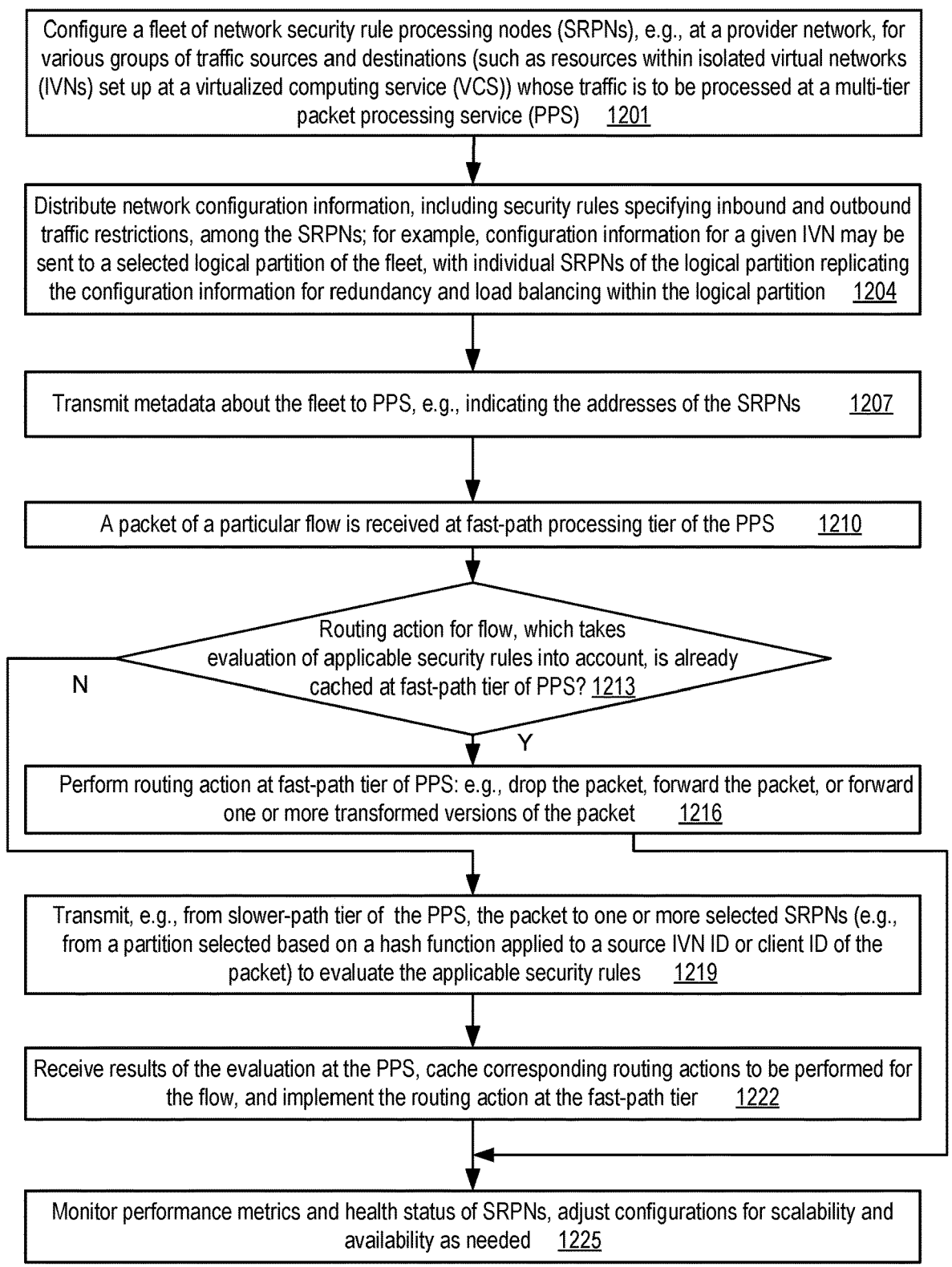
FIG. 12 is a flow diagram illustrating aspects of operations that may be performed to distribute network security rules processing workload across a fleet of nodes, according to at least some embodiments.

FIG. 12 is a flow diagram illustrating aspects of operations that may be performed to distribute network security rules processing workload across a fleet of nodes, according to at least some embodiments. As shown in element 1201, a fleet of network security rule processing nodes (SRPNs), similar in features and functionality to SRPNs 151 of FIG. 1, may be configured at a provider network for various groups of traffic sources and destinations (such as compute instances and other resources configured within isolated virtual networks (IVNs) of a virtualized computing service (VCS) of the provider network). The traffic flowing between the sources and destinations may be processed at one or more packet processing intermediaries (e.g., load balancers, network address translators, and the like), implemented for example at a multi-tier packet processing service (PPS) similar in features and functionality to PPS 202 of FIG. 2. In at least some embodiments, individual SRPNs may themselves comprise compute instances of the VCS, instantiated for example at the request of provisioning managers of a control plane of the security rule processing fleet (SRPF). In some embodiments, multiple SRPFs may be set up, e.g., at respective data centers or availability containers of the provider network. In at least one embodiment, the SRPNs may be configured within IVNs established specifically for rule processing; that is, special-purpose IVNs, different from the IVNS set up for VCS clients' compute instances, may be used for the SRPF. The SRPF may be organized as a collection of logical partitions or shards, with individual partitions configured for evaluating security rules for a respective subset of the traffic sources and destinations in some embodiments.

Network configuration information, including security rules specifying inbound and outbound traffic restrictions for the packet processing intermediaries, traffic sources and destinations, may be distributed among the SRPNs in various embodiments (element 1204), e.g., from the control plane or administrative components of a VCS. Some of the security rules may be indicated within security groups associated with virtual network interfaces (VNIs), with the security groups being defined or specified, for example, by VCS clients using programmatic interfaces. One or more VNIs may, for example, be programmatically attached to a compute instance, or configured as an endpoint for a packet processing application such as a load balancer. Each VNI may have one or more network addresses and one or security groups defined in some embodiments; each rule group may have zero or more rules for inbound traffic (packets directed to an address of the VNI) and zero or more rules for outbound traffic (packets directed from an address of the VNI). A given security rule may, for example, indicate a set of allowed traffic sources and ports as well as a networking protocol.

In some embodiments, network configuration information pertaining to a given IVN may be distributed to a logical partition selected based on hashing the given IVN's identifier. At least some of the logical partitions may comprise a plurality of SRPNs in various embodiments, each of which stores copies of the configuration information provided to the logical partition to enable load balancing and configuration data redundancy within the logical partition. In addition to the security rules themselves, other configuration information which may be needed for processing the rules, and may therefore be distributed to the SRPNs, may include, for example, (a) mappings from security group identifiers to one or more security rules, (b) mappings from virtual network interfaces to security groups, (c) mappings from security groups to virtual network interfaces, (d) one or more route table entries, or (d) one or more rules of an encapsulation protocol that may be used at a VCS. Some or all of these elements of network configuration information may be required to (a) identify the subset of security rules, among the security rules stored at an SRPN, which is applicable to a packet flow and/or (b) evaluate the subset of applicable security rules. For example, the information obtained at an SRPN about a packet flow may indicate a source VNI in some cases, so mappings between VNIs and security groups, as well as mappings between security groups and individual security rules, may be examined to identify the applicable rules for the flow. In some cases, sources and/or destinations in a given security rule may be specified using security group identifiers or service names instead of network addresses. So mappings from the security groups to virtual network interfaces may also have to be examined. Route table entries may have to be searched (e.g., using longest prefix matching algorithms or the like) in some embodiments to identify destination virtual network interfaces of a traffic flow, and then a determination may have to be made as to whether transmission of packets of the flow is permitted to at least one of the security groups defined for the destination virtual network interfaces. In some cases, the packet processing service may have to use encapsulation protocol rules to map logical (e.g., IVN-based) addresses indicated in security rules to physical substrate network addresses or to VNIs, and so on, in order to determine the complete set of applicable rules. In at least one embodiment, efficient data structures, such as a lock-free, concurrent version of an open addressing hash table with O(1) lookup time, may be used to store at least a portion of the network configuration information at an SRPN, so that it takes very little time to look up the required subset of the data at run-time for a given packet whose security rules are to be evaluated. In some embodiments, the security rules themselves may be stored in executable form at the SRPNs, e.g., in eBPF byte code. In at least one embodiment, the byte code may be generated at the SRPNs themselves—e.g., the rules may be obtained at the SRPNs in non-executable or source code form, and converted to optimized executable code by a code generator at the SRPN.

Metadata about the SRPF, such as the number of logical partitions, the number and addresses of the SRPNs within the partitions, etc., may be transmitted to the nodes of the packet processing service and/or any other packet processing intermediaries that may utilize the SRPF in the depicted embodiment (element 1207). For example, if a PPS with the multi-tier architecture shown in FIG. 2 is employed, the SRPF information may be provided to nodes at the decisions tier and/or the flow state tracking tier.

A packet of a particular flow may be received at the PPS (element 1210), e.g., at a fast-path processing node (FPPN) of a fast-path processing tier being used for a particular packet processing application. A determination may be made as to whether a routing action for the packets of the particular flow, which was generated after taking applicable security rules into account, is already present in a cache at the FPPN (element 1213). If such a cached routing action is found, the action (which may for example comprise forwarding the packet, transforming and the forwarding the packet, generating multiple copies of the packet and forwarding them all, or dropping the packet) may be performed at the fast-path tier (element 1216).

If the fast-path tier cache does not contain such an action (as also detected in operations corresponding to element 1213), the packet may be transmitted to one or more selected SRPNs from one of the other tiers (e.g., the flow state tracking tier or the decisions tier) of the PPS in the depicted embodiment (element 1219). In some embodiments, additional metadata pertaining to the packet may also be passed to the SRPN(s), e.g., including information about the VNI from which the packet was received, the IVN from which it was received, etc. The particular SRPN(s) may be selected from the fleet using a pair of algorithms (one to select a partition, and another to select the replica within the partition) similar to that shown in FIG. 9 in some embodiments. At the selected SRPN(s), the set of security rules applicable to the packet may be identified using the configuration data that was propagated to the SRPN earlier in the depicted embodiment. In some embodiments, security rules for the forward direction of the packet flow may be evaluated at a different SRPN than the security rules for the reverse direction.

The results of the evaluations performed at the SRPNs may be transmitted to the PPS (element 1222). After the results are received, e.g., at the decisions tier or the flow state tracking tier, any additional packet processing operations needed (e.g., transformation operations) may be determined at the slower-path tiers of the PPS. The routing actions to be performed with respect to the packet that was initially received at the PPS, which may be based on the combination of the security rule evaluation results and any additional packet processing operations, may be generated and cached at one or more tiers including the fast-path tier. The routing action may be implemented at the fast-path tier—e.g., one or more packets corresponding to the received packet may be transmitted towards a destination, or the received packet may be dropped. Operations corresponding to elements 1210-1222 may also be performed for other packets received at the PPS in the depicted embodiment. Performance metrics and health status of the SRPNs may be monitored by SRPF control plane components (element 1225) in various embodiments, and the SRPF configurations may be adjusted for scalability and availability as needed (e.g., by adding/removing SRPNs, changing partition selection algorithms, restarting SRPNs that are unresponsive or have failed, provisioning replacement SRPNs for failed SRPNs, and so on).

It is noted that in various embodiments, at least some operations other than those illustrated in the flow diagram of FIG. 12 may be used to implement the security rule processing and packet processing techniques described above. Some of the operations shown may not be implemented in some embodiments or may be implemented in a different order, or in parallel rather than sequentially.

Use Cases

The techniques described above for performing networking security related operations at a distributed fleet of nodes of a provider network may be extremely beneficial in a variety of scenarios. As more and more distributed applications are migrated to provider network environments, especially environments in which isolated virtual networks (IVNs) are established for different clients, the need for efficient and fault-tolerant management of packet processing operations that also take IVN configuration requirements including security rules into account is also increasing. Especially in environments in which virtual network interfaces are configured in multiplexed mode, so that the traffic directed to a single network address may actually be distributed among several different hosts via an aggregated set of virtual network interfaces, maintaining consistent configuration information required for security rule evaluation at all the hosts without overloading the hosts may be challenging. By decoupling the rule processing work from other packet processing tasks, and by using an automatically scaled fleet of security rule processing nodes among which the overall rule processing work is intelligently distributed, the rollout of packet processing applications may be accelerated. Furthermore, it may become easier for system administrations to analyze and debug security-related issues when such fleets are used. If/when new and improved security mechanisms are introduced at a provider network (such as new ways of specifying security rules, or more efficient techniques for evaluating the rules), the impact of such changes may be isolated largely or entirely to the security rule processing fleet, thereby reducing the need for modifications at the provider network services from which the fleet is utilized.

Illustrative Computer System

Figure 13:
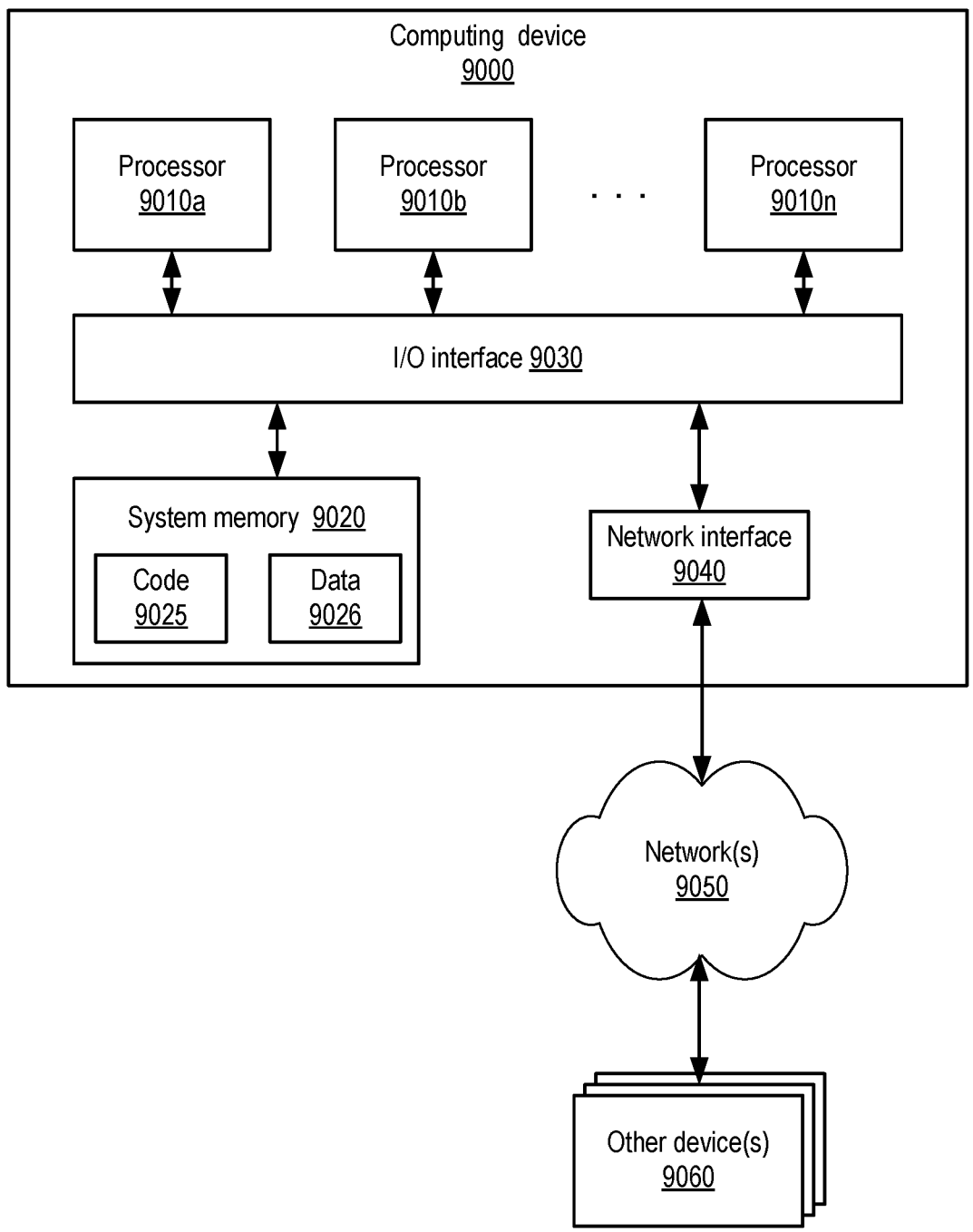
FIG. 13 is a block diagram illustrating an example computing device that may be used in at least some embodiments.

In at least some embodiments, a server that implements a portion or all of one or more of the technologies described herein, including various components of a security rule processing fleet, a packet processing service, a virtualized computing service and the like may include a general-purpose computer system that includes or is configured to access one or more computer-accessible media. FIG. 13 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030. In at least some embodiments computing device 9000 may include a motherboard to which some or all of such components may be attached.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 12 for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 12 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 13 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g.

SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
   performing, at a plurality of computing devices:
   obtaining, at one or more nodes of a plurality of security rule processing nodes, network configuration information associated with a plurality of networks, wherein the network configuration information includes a plurality of security rules;
   receiving, at a packet processing service, a packet of a particular flow associated with a network of the plurality of networks;
   transmitting, from the packet processing service to a first security rule processing node of the plurality of rule processing nodes, at least the packet to request evaluation of the packet at the first security rule processing node;
   evaluating, at the first security rule processing node, based at least in part on one or more headers of the packet and the network configuration information, at least a subset of one or more ones of the plurality of security rules applicable to the particular flow to provide a result of the evaluation of the packet to the packet processing service; and
   initiating, at the packet processing service, based at least in part on the result of the evaluation received from the first security rule processing node, at least one routing action with respect to the packet.

2. The method as recited in claim 1, wherein the subset of the one or more security rules applicable to the particular flow comprises one or more rules applicable to inbound packets of the particular flow with respect to a packet processing application, the method further comprising performing, at the one or more computing devices:
   evaluating, at a second security rule processing node, one or more rules applicable to outbound packets of the particular flow with respect to the packet processing application.

3. The method as recited in claim 1, wherein the one or more security rules comprise one or more of: (a) a first rule for inbound packets associated with a network interface, indicating a networking protocol, one or more traffic source addresses, and a network port, or (b) a second rule for outbound packets associated with the network interface, indicating a networking protocol, one or more traffic destination addresses, and a network port.

4. The method as recited in claim 1, wherein in a particular security rule of the one or more security rules, a traffic destination or source is indicated by one or more of: (a) a range of network addresses, expressed in CIDR (Classless Inter-Domain Routing) format, (b) an identifier of a security group configured for one or more virtual network interfaces, wherein the security group includes one or more additional security rules, or (c) an identifier of a network-accessible service.

5. The method as recited in claim 1, wherein evaluating at least the subset of the one or more security rules comprises executing an eBPF (extended Berkeley Packet Filter) program.

6. The method as recited in claim 1, further comprising performing, at the one or more computing devices:
   generating an executable version of a particular security rule at the first security rule processing node, wherein the executable version comprises byte code executable at a virtual machine, wherein evaluating the one or more security rules comprises utilizing the executable version.

7. The method as recited in claim 1, wherein the network configuration information comprises one or more of: (a) a mapping from a security group identifier to one or more security rules, wherein the security group identifier is created in response to a programmatic request from a client of a computing service, and wherein a security group is assigned to one or more virtual network interfaces, (b) a mapping from a first virtual network interface to a first security group, (c) a mapping from a second security group to a second virtual network interface, wherein the second security group is same as or different from the first security group and the second virtual network interface is same as or different from the first virtual network interface, (d) one or more route table entries, or (d) one or more encapsulation protocol rules.

8. The method as recited in claim 1, wherein the routing action comprises dropping the packet.

9. The method as recited in claim 1, wherein the network security configuration information comprises one or more route table entries, the method further comprising performing, at the one or more computing devices:
   utilizing, at the first security rule processing node, a longest prefix match algorithm and the one or more route table entries to identify a destination virtual network interface for the particular flow; and
   determining whether a security group of the destination virtual network interface is among a set of security groups to which the first security rule processing node is permitted to send packets of the particular flow.

10. The method as recited in claim 1, further comprising performing, at the one or more computing devices:
    storing, at the first security rule processing node, using a lock-free, concurrent version of an open addressing hash table with O(1) lookup time, at least a portion of the network configuration information, wherein evaluating the subset of one or more security rules applicable to the particular flow comprises accessing the hash table.

11. A system, comprising:
    a plurality of computing devices including instructions that upon execution on or across respective processors cause the computing devices to:
    obtain, at one or more nodes of a plurality of security rule processing nodes, network configuration information associated with a plurality of networks, wherein the network configuration information includes a plurality of security rules;
    receive, at a packet processing service, a packet of a particular flow associated with a network of the plurality of networks;
    transmit, from the packet processing service to a first security rule processing node of the plurality of rule processing nodes, at least the packet to request evaluation of the packet at the first security rule processing node;

evaluate, at the first security rule processing node, based at least in part on one or more headers of the packet and the network configuration information, at least a subset of one or more ones of the plurality of security rules applicable to the particular flow to provide a result of the evaluation of the packet to the packet processing service; and initiate, at the packet processing service, based at least in part on the result of the evaluation received from the first security rule processing node, at least one routing action with respect to the packet.

12. The system as recited in claim 11, wherein the subset of the one or more security rules applicable to the particular flow comprises one or more rules applicable to inbound packets of the particular flow with respect to a packet processing application, the computing devices include further instructions that upon execution on or across the respective processors further cause the computing devices to:

evaluate, at a second security rule processing node, one or more rules applicable to outbound packets of the particular flow with respect to the packet processing application.

13. The system as recited in claim 11, wherein the one or more security rules comprise one or more of: (a) a first rule for inbound packets associated with a network interface, indicating a networking protocol, one or more traffic source addresses, and a network port, or (b) a second rule for outbound packets associated with the network interface, indicating a networking protocol, one or more traffic destination addresses, and a network port.

14. The system as recited in claim 11, wherein in a particular security rule of the one or more security rules, a traffic destination or source is indicated by one or more of: (a) a range of network addresses, expressed in CIDR (Classless Inter-Domain Routing) format, (b) an identifier of a security group configured for one or more virtual network interfaces, wherein the security group includes one or more additional security rules, or (c) an identifier of a network-accessible service.

15. The system as recited in claim 11, wherein to evaluate at least the subset of the one or more security rules comprises to execute an eBPF (extended Berkeley Packet Filter) program.

16. One or more non-transitory computer-accessible storage media storing program instructions that when executed on or across respective processors cause a plurality of computing devices to:

obtain, at one or more nodes of a plurality of security rule processing nodes, network configuration information associated with a plurality of networks, wherein the network configuration information includes a plurality of security rules;

receive, at a packet processing service, a packet of a particular flow associated with a network of the plurality of networks;

transmit, from the packet processing service to a first security rule processing node of the plurality of rule processing nodes, at least the packet to request evaluation of the packet at the first security rule processing node;

evaluate, at the first security rule processing node, based at least in part on one or more headers of the packet and the network configuration information, at least a subset of one or more ones of the plurality of security rules applicable to the particular flow to provide a result of the evaluation of the packet to the packet processing service; and initiate, at the packet processing service, based at least in part on the result of the evaluation received from the first security rule processing node, at least one routing action with respect to the packet.

17. The one or more non-transitory computer-accessible storage media as recited in claim 16, wherein the subset of the one or more security rules applicable to the particular flow comprises one or more rules applicable to inbound packets of the particular flow with respect to a packet processing application, the one or more non-transitory computer-accessible storage media storing further instructions that upon execution on or across the respective processors further cause the computing devices to:

evaluate, at a second security rule processing node, one or more rules applicable to outbound packets of the particular flow with respect to the packet processing application.

18. The one or more non-transitory computer-accessible storage media as recited in claim 16, wherein the one or more security rules comprise one or more of: (a) a first rule for inbound packets associated with a network interface, indicating a networking protocol, one or more traffic source addresses, and a network port, or (b) a second rule for outbound packets associated with the network interface, indicating a networking protocol, one or more traffic destination addresses, and a network port.

19. The one or more non-transitory computer-accessible storage media as recited in claim 16, wherein in a particular security rule of the one or more security rules, a traffic destination or source is indicated by one or more of: (a) a range of network addresses, expressed in CIDR (Classless Inter-Domain Routing) format, (b) an identifier of a security group configured for one or more virtual network interfaces, wherein the security group includes one or more additional security rules, or (c) an identifier of a network-accessible service.

20. The one or more non-transitory computer-accessible storage media as recited in claim 16, wherein to evaluate at least the subset of the one or more security rules comprises to execute an eBPF (extended Berkeley Packet Filter) program.

* * * * *